(12) United States Patent
Watanabe

(10) Patent No.: US 8,572,893 B2
(45) Date of Patent: Nov. 5, 2013

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 54 days.

(21) Appl. No.: 13/375,489

(22) PCT Filed: May 27, 2010

(86) PCT No.: PCT/JP2010/059030
§ 371 (c)(1),
(2), (4) Date: Dec. 1, 2011

(87) PCT Pub. No.: WO2010/140537
PCT Pub. Date: Dec. 9, 2010

(65) Prior Publication Data
US 2012/0069273 A1    Mar. 22, 2012

(30) Foreign Application Priority Data
Jun. 3, 2009   (JP) ................................ 2009-134461

(51) Int. Cl.
*G02F 1/1335*   (2006.01)

(52) U.S. Cl.
USPC ............................................. 49/64; 349/73

(58) Field of Classification Search
USPC ................................... 349/64, 112
See application file for complete search history.

(56) References Cited

U.S. PATENT DOCUMENTS

| | | |
|---|---|---|
| 4,660,936 A | 4/1987 | Nosker |
| 4,695,135 A | 9/1987 | Den Exter Blokland et al. |
| 6,380,994 B1 * | 4/2002 | Iigahama et al. ............... 349/73 |
| 6,483,482 B1 * | 11/2002 | Kim ............................... 345/3.1 |
| 2002/0165310 A1 * | 11/2002 | Zhou et al. .................... 524/500 |
| 2004/0051944 A1 | 3/2004 | Stark |
| 2006/0038935 A1 * | 2/2006 | Kim ............................... 349/64 |
| 2006/0119951 A1 * | 6/2006 | McGuire, Jr. ................. 359/630 |

(Continued)

FOREIGN PATENT DOCUMENTS

| | | |
|---|---|---|
| JP | 61-267002 A | 11/1986 |
| JP | 62-175711 A | 8/1987 |

(Continued)

OTHER PUBLICATIONS

Official Communication issued in International Patent Application No. PCT/JP2010/059030, mailed on Jul. 6, 2010.

(Continued)

*Primary Examiner* — Bumsuk Won
*Assistant Examiner* — Edmond Lau
(74) *Attorney, Agent, or Firm* — Keating & Bennett, LLP

(57) ABSTRACT

A direct-viewing type display device includes a display panel including a display region which has a plurality of pixel lines extending in a first direction and a frame region, the display region and the frame region having a border extending in the first direction therebetween; and a light-transmitting cover. The plurality of pixel lines include a first pixel line adjoining the border, a second pixel line, and a third pixel line. The first pixel line, the second pixel line and the third pixel line are of different colors from each other. The light-transmitting cover includes a lens portion located over the border, the lens portion refracting a part of light going toward the frame region. A light diffusion structure is provided between the lens portion and a part of the display panel including the first pixel line, the second pixel line and the third pixel line.

16 Claims, 17 Drawing Sheets

(56) References Cited

U.S. PATENT DOCUMENTS

| | | | |
|---|---|---|---|
| 2006/0204744 A1 | 9/2006 | Hiraishi et al. | |
| 2006/0238440 A1* | 10/2006 | Kim et al. | 345/1.1 |
| 2006/0262255 A1* | 11/2006 | Wang et al. | 349/114 |
| 2008/0094700 A1* | 4/2008 | Uehara | 359/463 |
| 2009/0097261 A1* | 4/2009 | Hsieh et al. | 362/355 |
| 2009/0128914 A1* | 5/2009 | Lee et al. | 359/599 |
| 2010/0259566 A1 | 10/2010 | Watanabe | |
| 2011/0109535 A1 | 5/2011 | Watanabe et al. | |
| 2011/0242686 A1 | 10/2011 | Watanabe | |

FOREIGN PATENT DOCUMENTS

| | | |
|---|---|---|
| JP | 05-188873 A | 7/1993 |
| JP | 2002-122714 A | 4/2002 |
| JP | 2003-157031 A | 5/2003 |
| JP | 2004-524551 A | 8/2004 |
| JP | 2006-251395 A | 9/2006 |
| JP | 2007-010798 A | 1/2007 |
| JP | 2008-129546 A | 6/2008 |
| WO | 2008/149449 A1 | 12/2008 |
| WO | 2009/066436 A1 | 5/2009 |
| WO | 2009/157150 A1 | 12/2009 |

OTHER PUBLICATIONS

English translation of Official Communication issued in corresponding International Application PCT/JP2010/059030, mailed on Jan. 26, 2012.

* cited by examiner (a)　　　　　　　(b)　　　　　　　(c)

DISPLAY DEVICE

TECHNICAL FIELD

The present invention relates to a display device and particularly to a direct-viewing type display device.

BACKGROUND ART

A liquid crystal display device includes a liquid crystal display panel, a backlight device, circuits for supplying various electrical signals to the liquid crystal display panel, and a power supply, as well as a housing for accommodating these components. The liquid crystal display panel has a display region in which a plurality of pixels are arrayed and a frame region surrounding the display region. In the display region, pixel electrodes and TFTs are provided. In the frame region, a sealing portion, a portion in which driving circuits are mounted, and the like are provided. The frame region, in which no pixels are arrayed, does not contribute to displaying. In existing liquid crystal display devices, the frame region has been narrowed, but cannot be eliminated in principle.

When a large screen is constructed by arraying a plurality of display panels, joints appear in an image displayed on the large screen because frame regions of the display panels do not contribute to displaying. Patent Documents 1 and 2 each disclose a display device which has a light-transmitting cover provided on the viewer's side of a display panel in order to display a jointless image. An edge portion of the light-transmitting cover has a curved portion on the viewer's side. The curved portion functions as a lens, and thus will be referred to as a "lens portion", hereinafter. The lens portion of the light-transmitting cover is provided so as to overlap a frame region of the display panel and a part of the display region adjoining the frame region. The part of the display region that overlaps the lens portion will be referred to as a "peripheral display region". Light which goes out from pixels arrayed in the peripheral display region is refracted by the lens portion toward the frame region. As a result, an image is also displayed on a front surface of the frame region, so that a jointless image is displayed on the entire screen.

CITATION LIST

Patent Literature

Patent Document 1: Japanese Laid-Open Patent Publication No. 5-188873
Patent Document 2: Japanese PCT National Phase Laid-Open Publication No. 2004-524551

SUMMARY OF INVENTION

Technical Problem

The present inventor conducted studies to realize a novel display device in which the frame is visually obscured. When the light-transmitting cover having the lens portion disclosed in Patent Document 1 or 2 is located such that the lens portion overlaps the peripheral display region and the frame region of the display panel, the frame region can be made visually obscured. However, it has been found that in the case where the position-aligning precision of the light-transmitting cover or the shape precision of the surface of the lens portion on the viewer's side is low, different colors are displayed in different parts of an edge of the lens portion and this gives a sense of unnaturalness to the viewer, as described later in detail.

The present invention, made to solve the above-described problem, has an object of providing a display device for visually obscuring the frame region of the display panel and suppressing the sense of unnaturalness given to the viewer.

Solution to Problem

A direct-viewing type display device according to the present invention includes a display panel including a display region which has a plurality of pixel lines extending in a first direction and a frame region provided outside the display region, the display region and the frame region having a border extending in the first direction therebetween; and a light-transmitting cover located on a viewer's side of the display panel. The plurality of pixel lines include a first pixel line adjoining the border, a second pixel line adjoining the first pixel line, and a third pixel line adjoining the second pixel line; the first pixel line, the second pixel line and the third pixel line are of different colors from each other; the light-transmitting cover includes a lens portion located so as to stride over the border, the lens portion refracting a part of light, going out from the display region, toward the frame region; and a light diffusion structure is provided between the lens portion and a part of the display panel including the first pixel line, the second pixel line and the third pixel line.

In one embodiment, the light diffusion structure is located at a position overlapping a region including a part of the frame region of the display panel and a part of a peripheral display region in the display region, the part of the peripheral display region adjoining the part of the frame region.

In one embodiment, the light diffusion structure includes a low light diffusion region on the side of the display region, the low light diffusion region being formed such that a light diffusion degree thereof increases continuously or step by step from the side of the display region toward the frame region.

In one embodiment, the plurality of pixel lines are arrayed so as to adjoin each other in a second direction perpendicular to the first direction; and a light diffusion degree of the light diffusion structure in the second direction is higher than that in the first direction.

In one embodiment, a light scattering film is provided as the light diffusion structure.

In one embodiment, a lenticular lens is provided as the light diffusion structure.

In one embodiment, the light diffusion structure contains a diffusion adhesive having a haze value of 30% or greater and less than 70%.

Advantageous Effects of Invention

The present invention provides a display device for visually obscuring the frame region of the display panel and suppressing the sense of unnaturalness given to the viewer.

and (c) are each an enlarged cross-sectional view schematically showing an end portion and the vicinity thereof of a region 200B of the liquid crystal display device 200.

Figure 5:
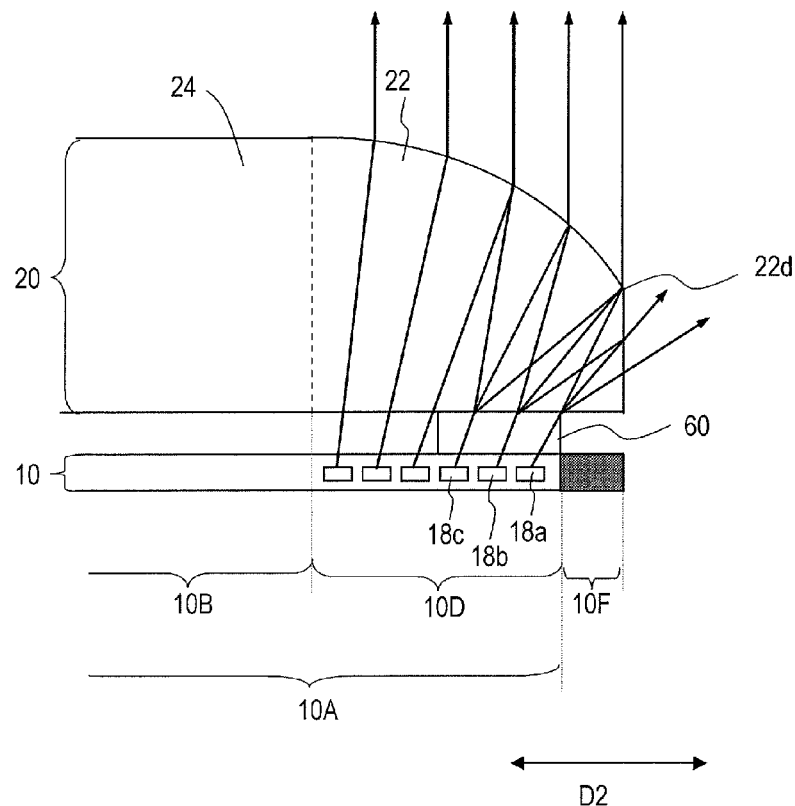

FIG. 5 An enlarged cross-sectional view schematically showing an end portion and the vicinity thereof of the liquid crystal display device 100.

Figure 6:
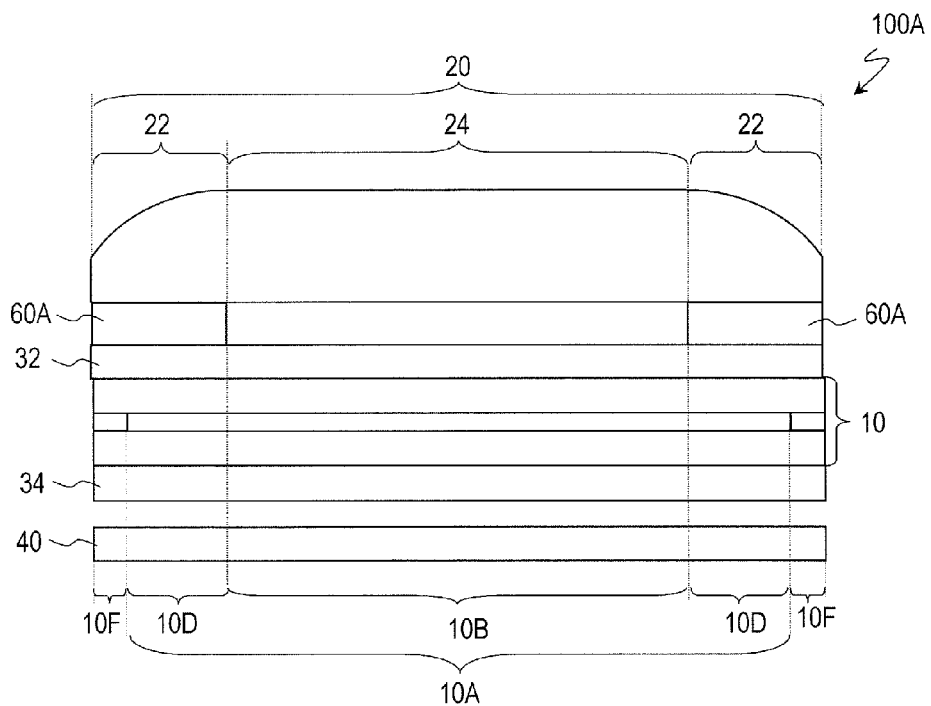

FIG. 6 A schematic cross-sectional view of a liquid crystal display device 100A.

Figure 7:
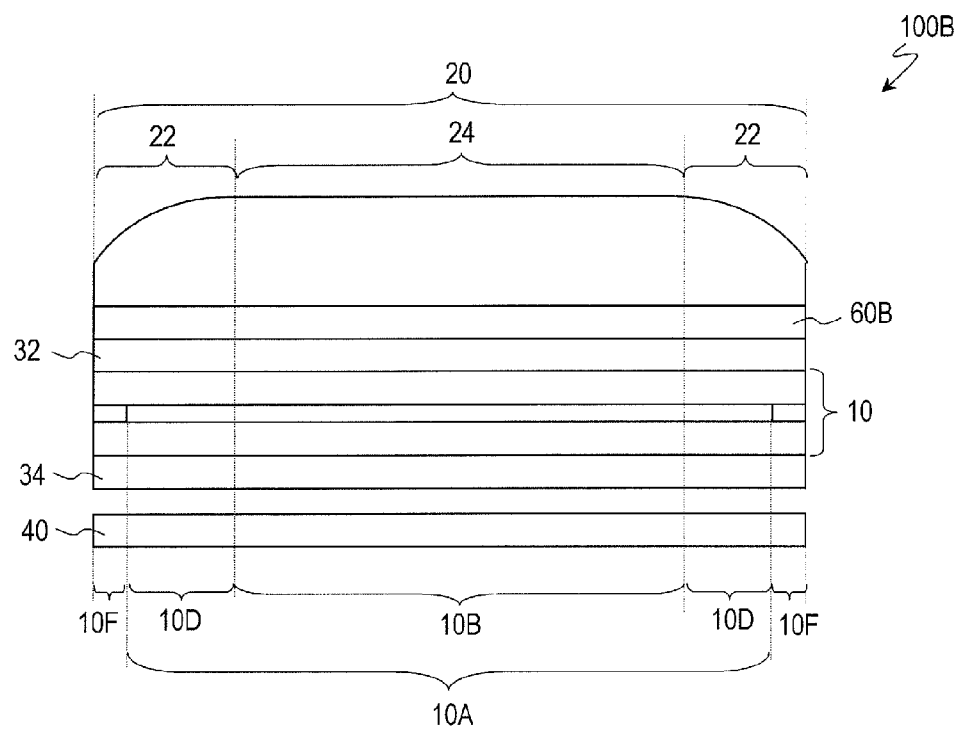

FIG. 7 A schematic cross-sectional view of a liquid crystal display device 100B.

Figure 8:
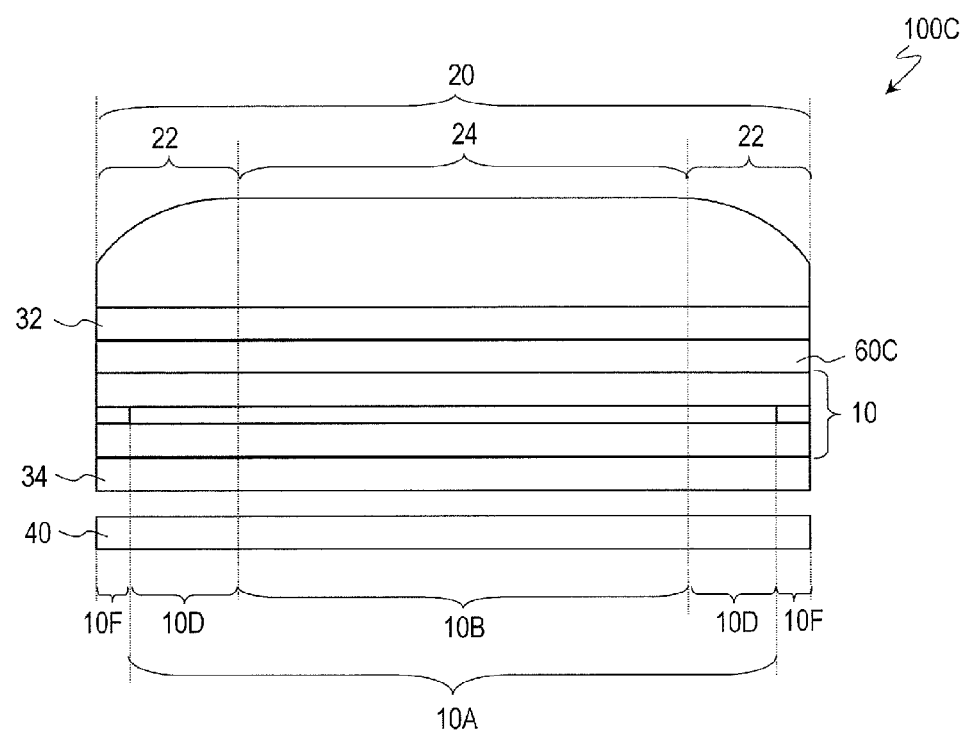

FIG. 8 A schematic cross-sectional view of a liquid crystal display device 100C.

Figure 9:
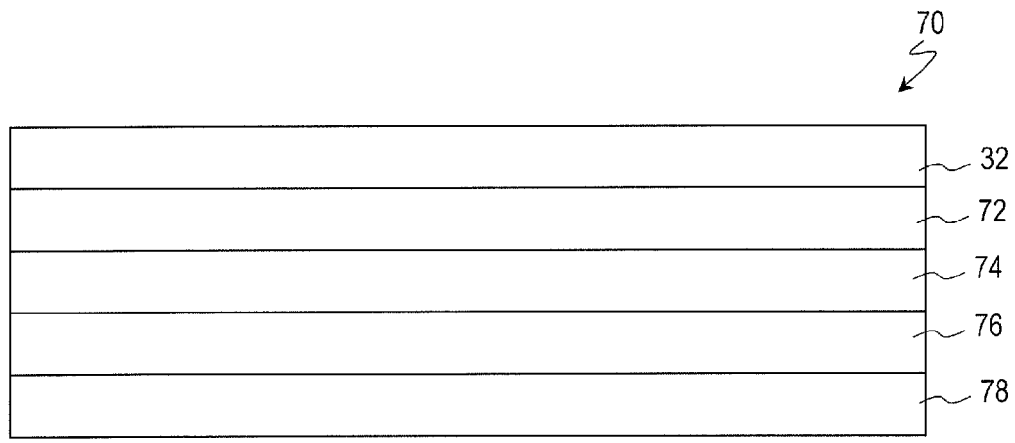

FIG. 9 A schematic cross-sectional view of an optical film stack 70.

Figure 10:
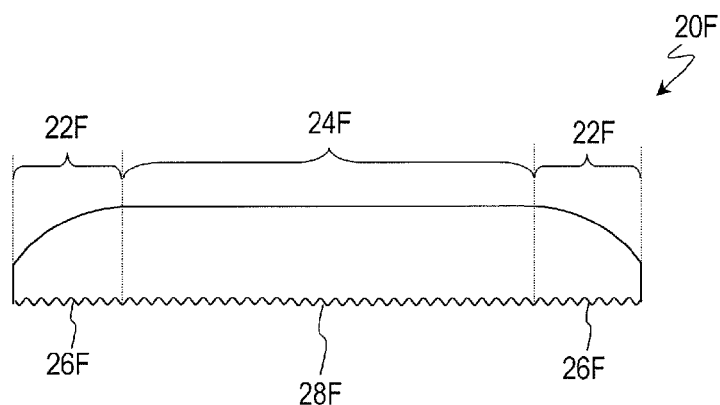

FIG. 10 A schematic cross-sectional view of a light-transmitting cover 20F.

Figure 11:
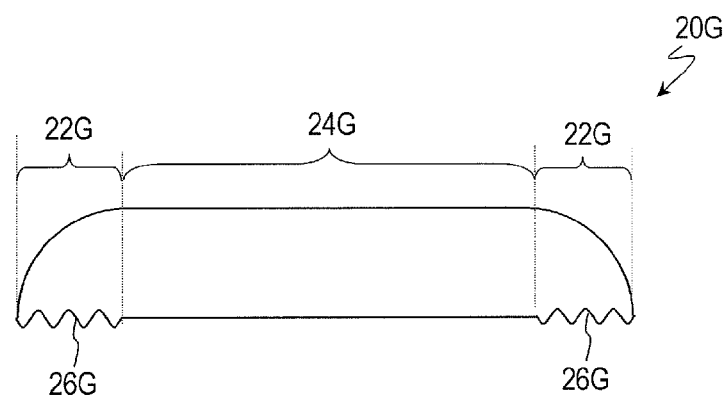

FIG. 11 A schematic cross-sectional view of a light-transmitting cover 20G.

Figure 12:
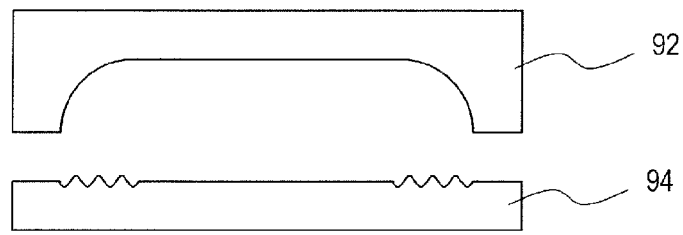

FIG. 12 A schematic cross-sectional view of an upper mold 92 and a lower mold 94.

Figure 13:
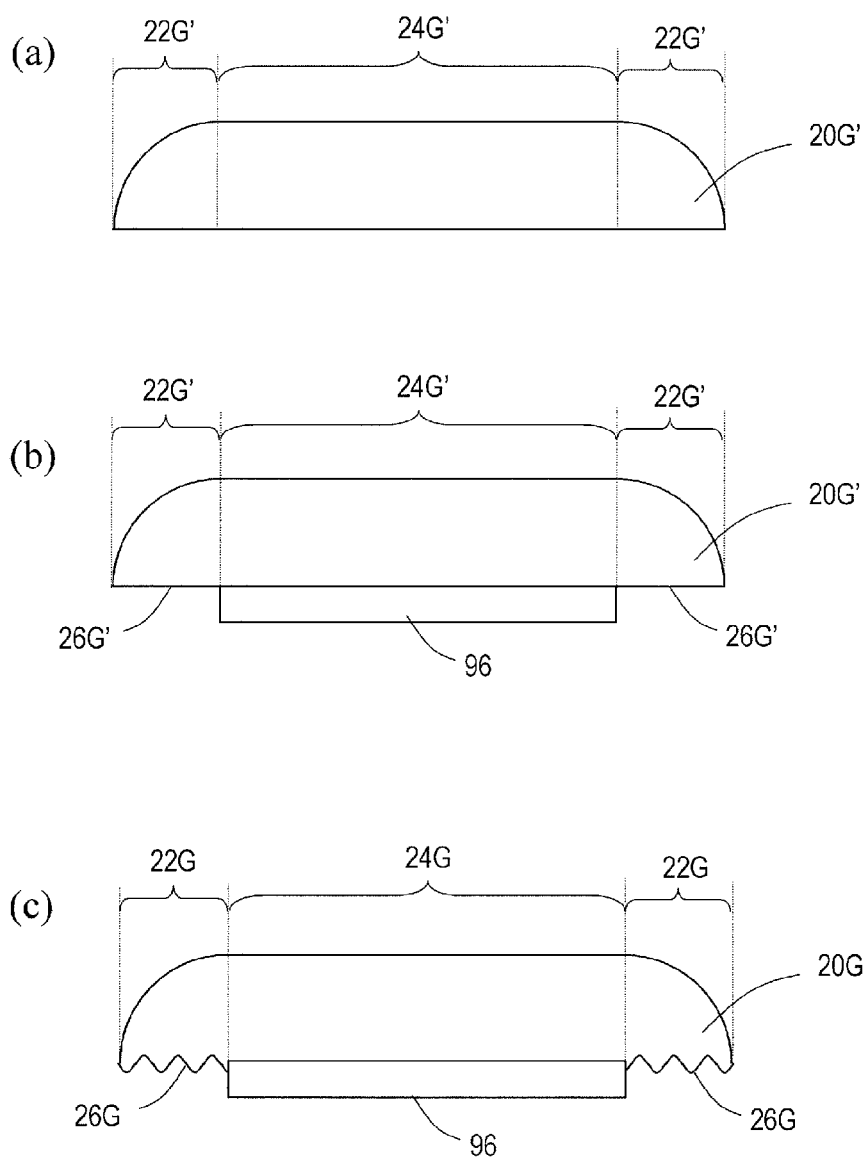

FIG. 13 (a) through (c) are schematic cross-sectional views illustrating a method for producing the light-transmitting cover 20G.

Figure 14:
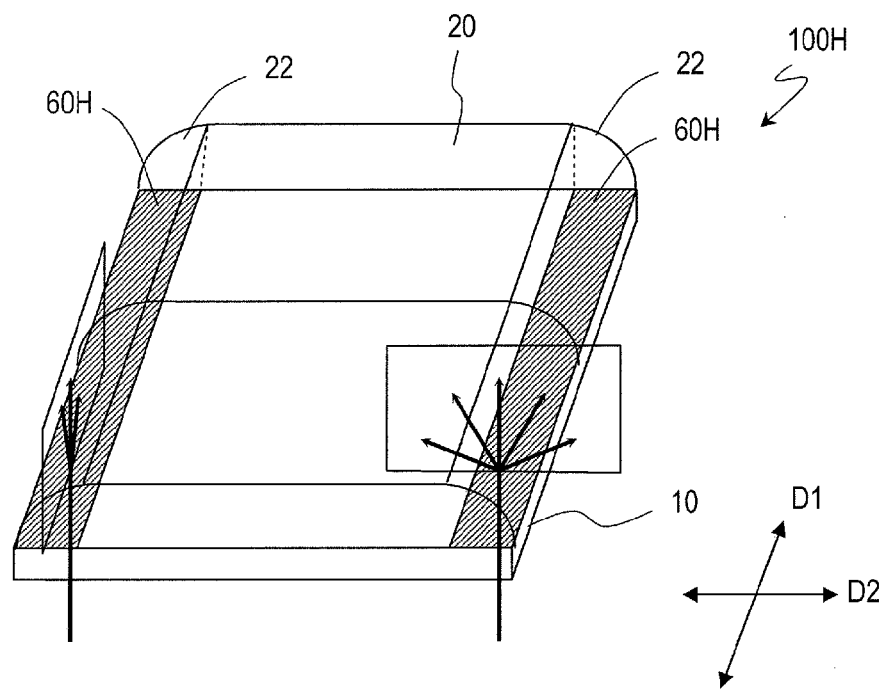

FIG. 14 A schematic cross-sectional view of a liquid crystal display device 100H.

Figure 15:
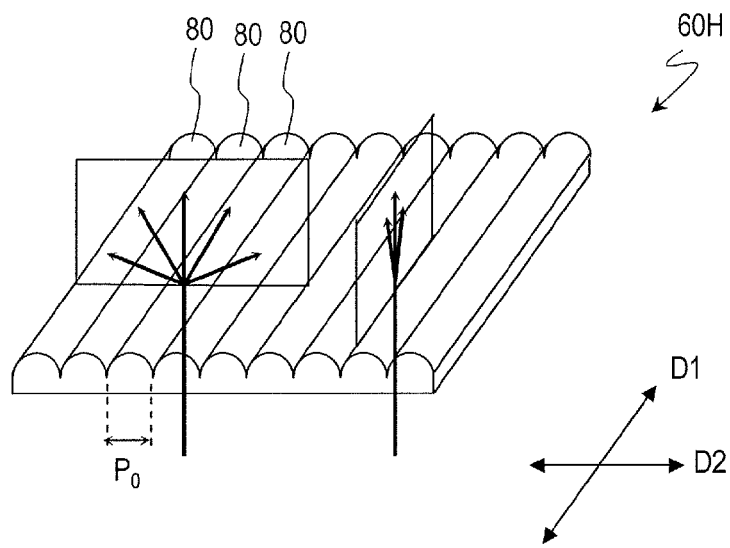

FIG. 15 A schematic cross-sectional view of a light diffusion structure 60H.

Figure 16:
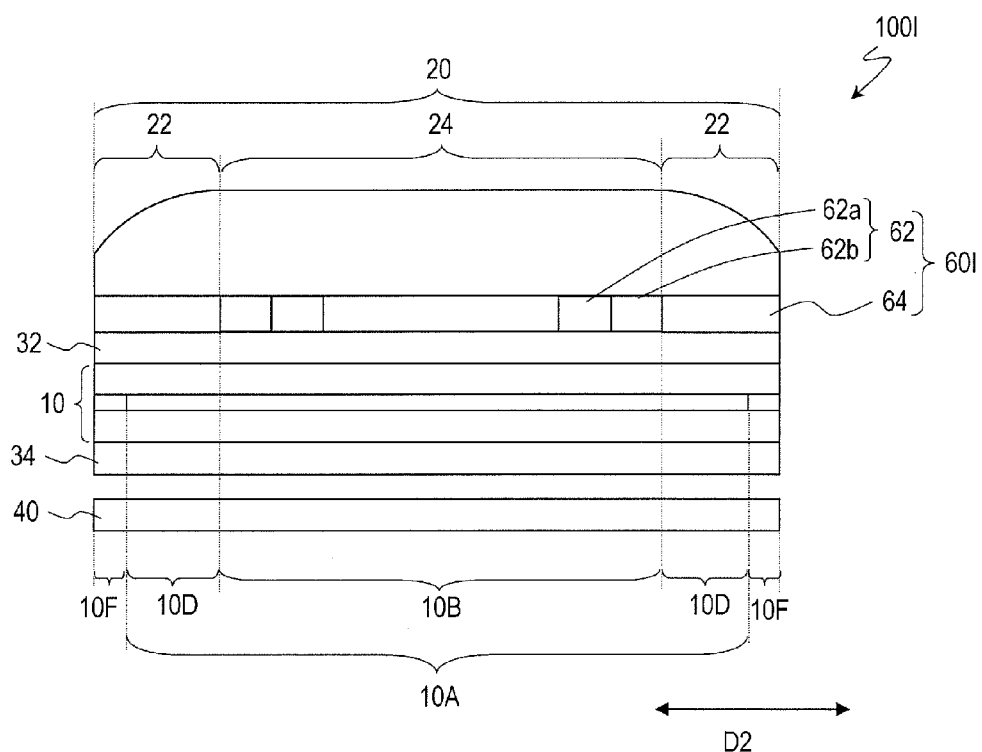

FIG. 16 A schematic cross-sectional view of a liquid crystal display device 100I.

Figure 17:
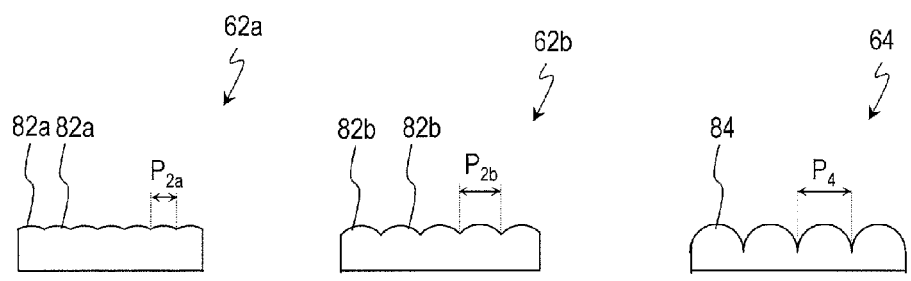

FIG. 17 (a) is a schematic cross-sectional view of a first low light diffusion portion 62a of a light diffusion structure 60I, (b) is a schematic cross-sectional view of a second low light diffusion portion 62b of the light diffusion structure 60I, and (c) is a schematic cross-sectional view of a high light diffusion portion 64 of the light diffusion structure 60I.

Figure 18:
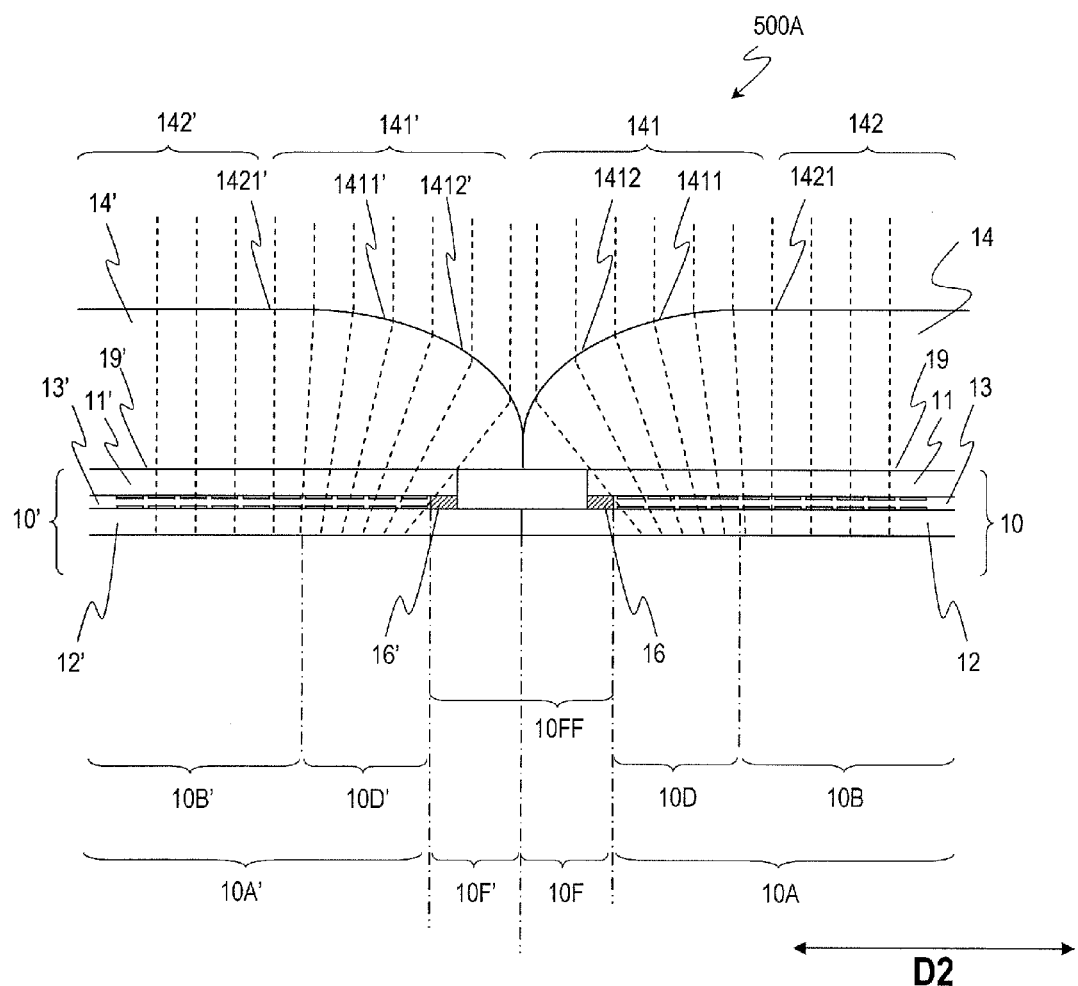

FIG. 18 A schematic partial cross-sectional view of a liquid crystal display device 500A in an embodiment according to the present invention.

Figure 19:
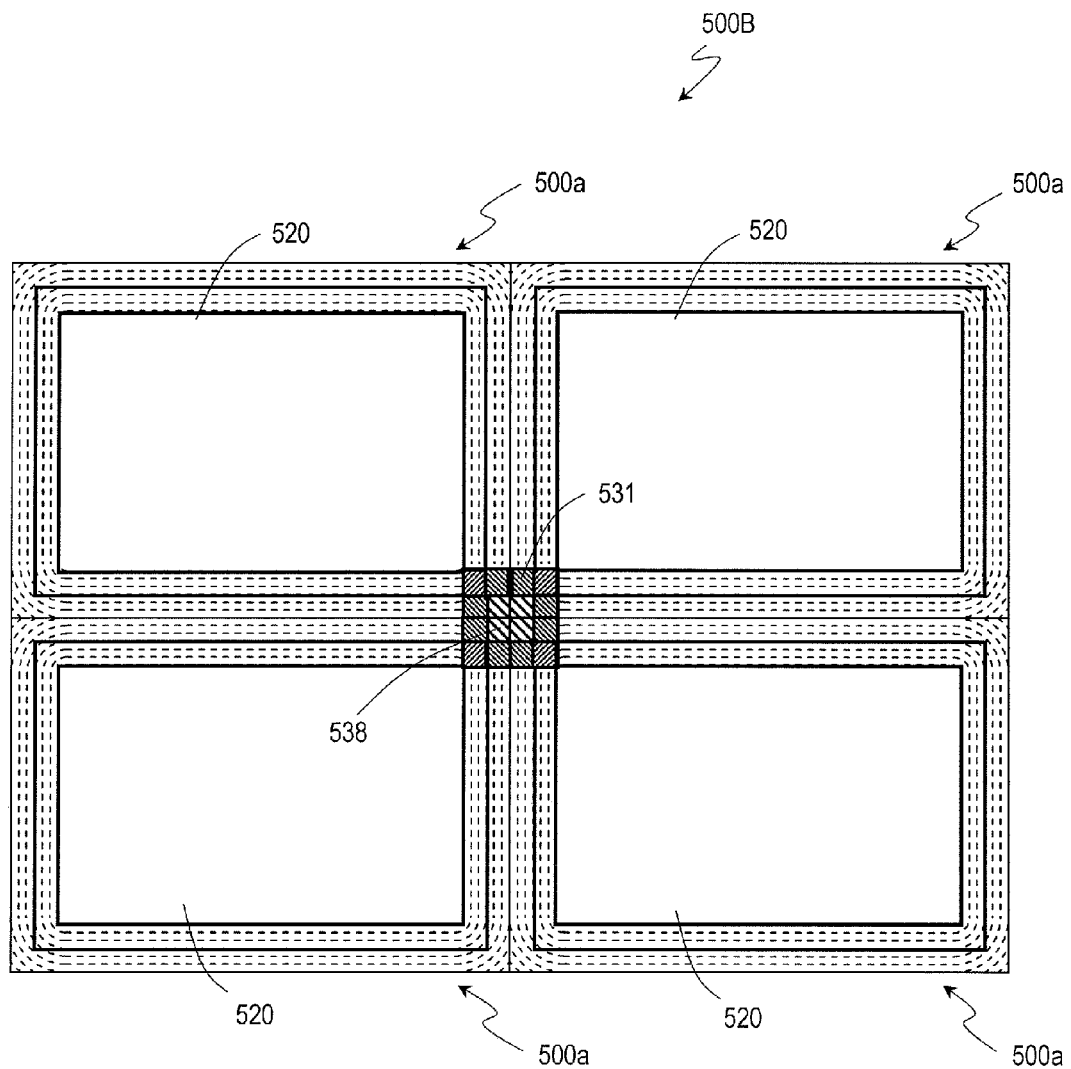

FIG. 19 A schematic plan view of a liquid crystal display device 500B in an embodiment according to the present invention.

Figure 20:
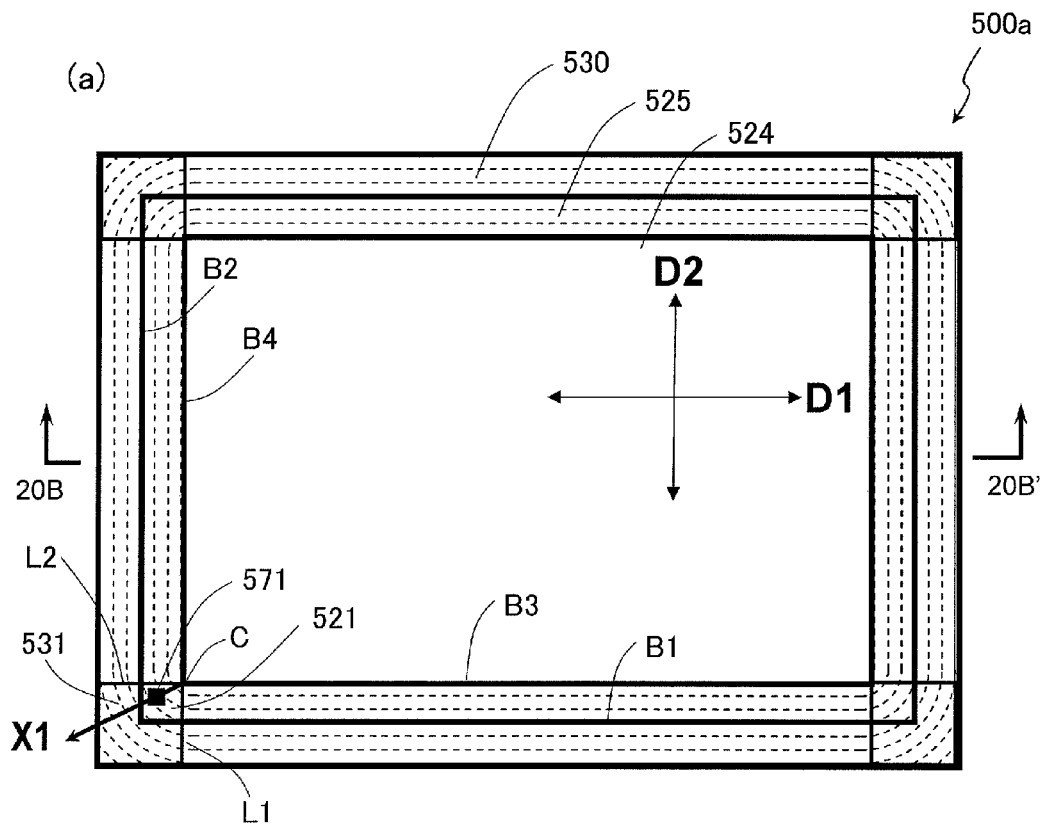
Figure 20:
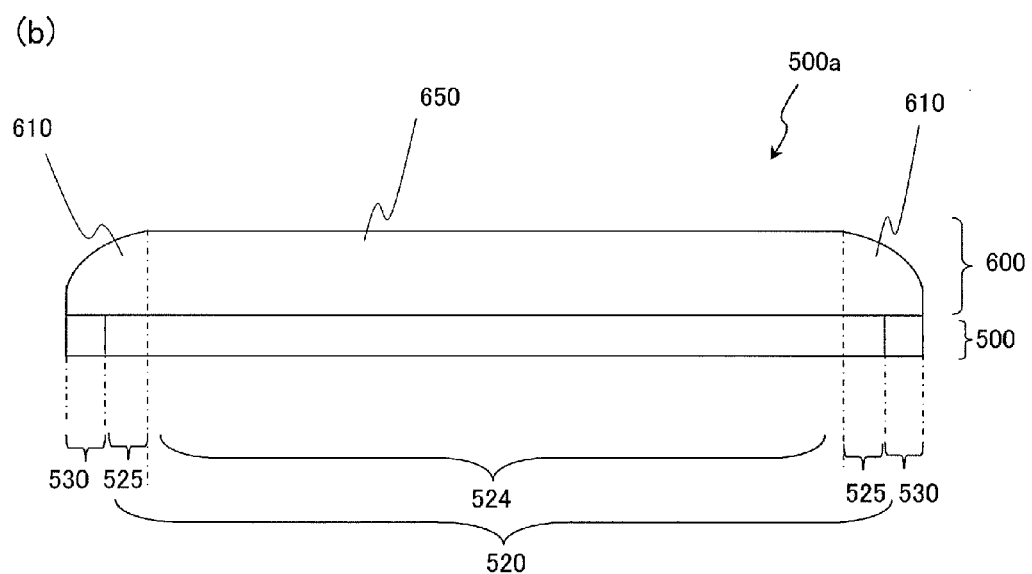

FIGS. 20 (a) and (b) each show a structure of a liquid crystal display device 500a used in the liquid crystal display device 500B in the embodiment according to the present invention; (a) is a schematic plan view, and (b) is a schematic cross-sectional view taken along line 20B-20B' in (a).

Figure 21:
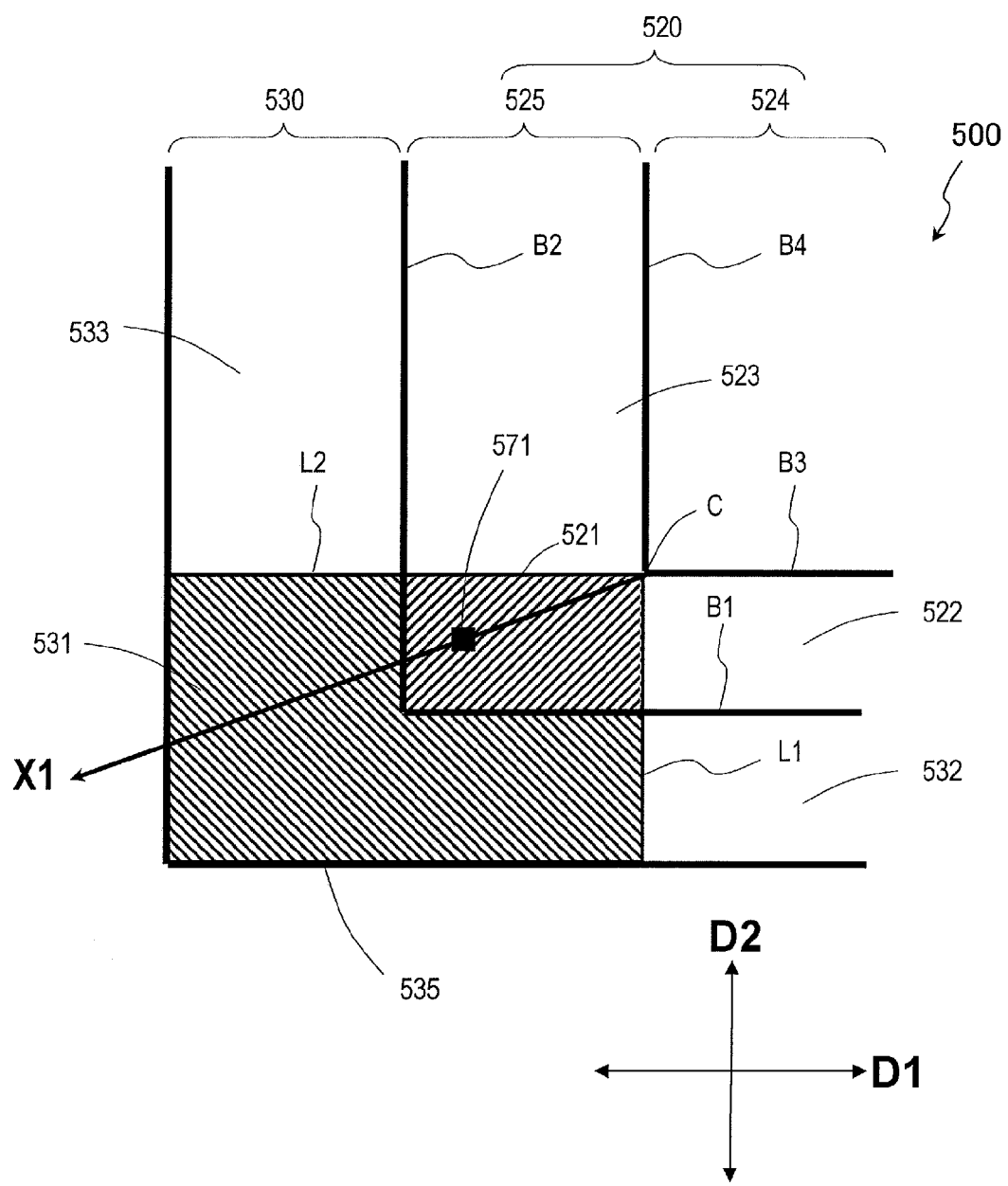

FIG. 21 A schematic top view of an end portion of a liquid crystal display panel 500.

Figure 22:
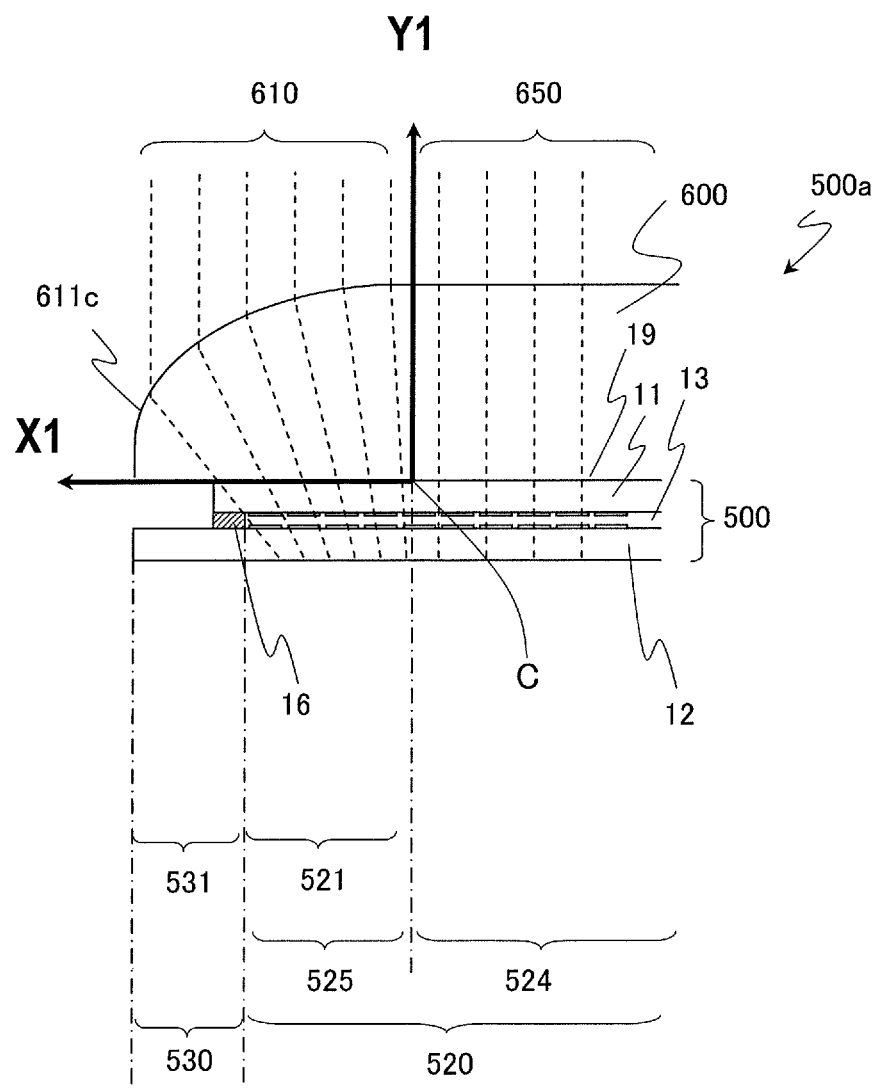

FIG. 22 A schematic cross-sectional view of an end portion of the liquid crystal display device 500a.

Figure 23:
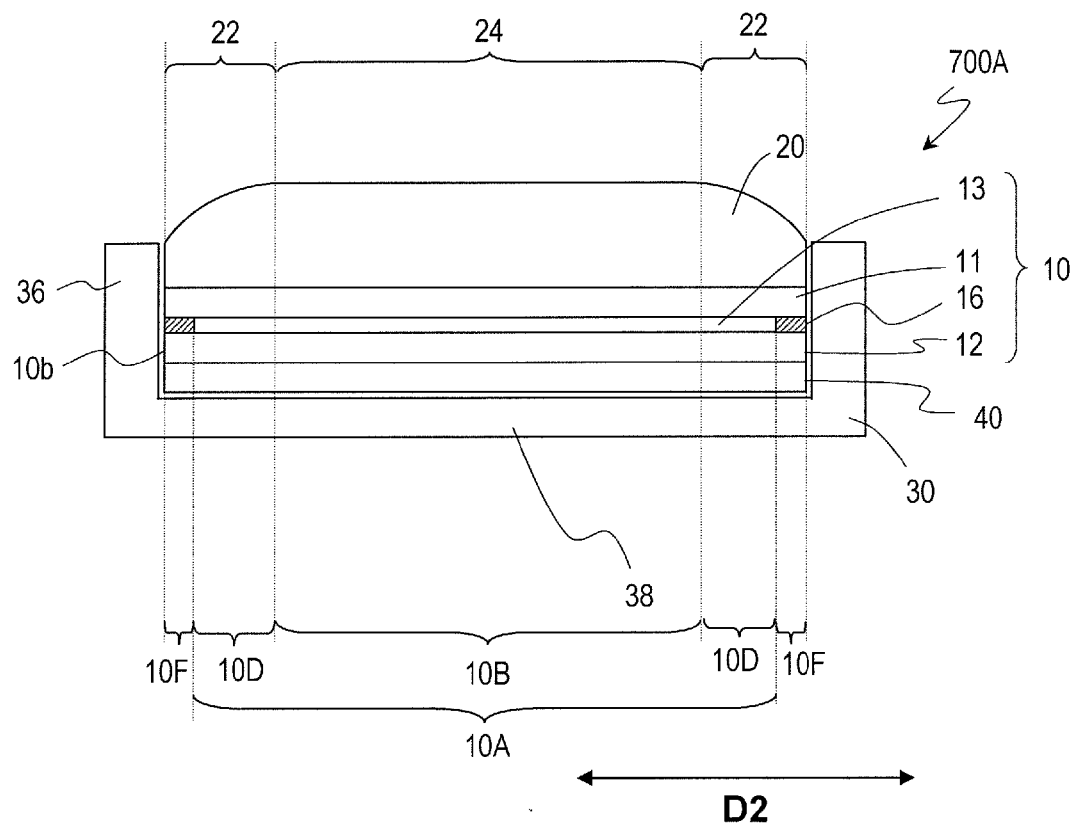

FIG. 23 A schematic cross-sectional view of a liquid crystal display device 700A in an embodiment according to the present invention.

Figure 24:
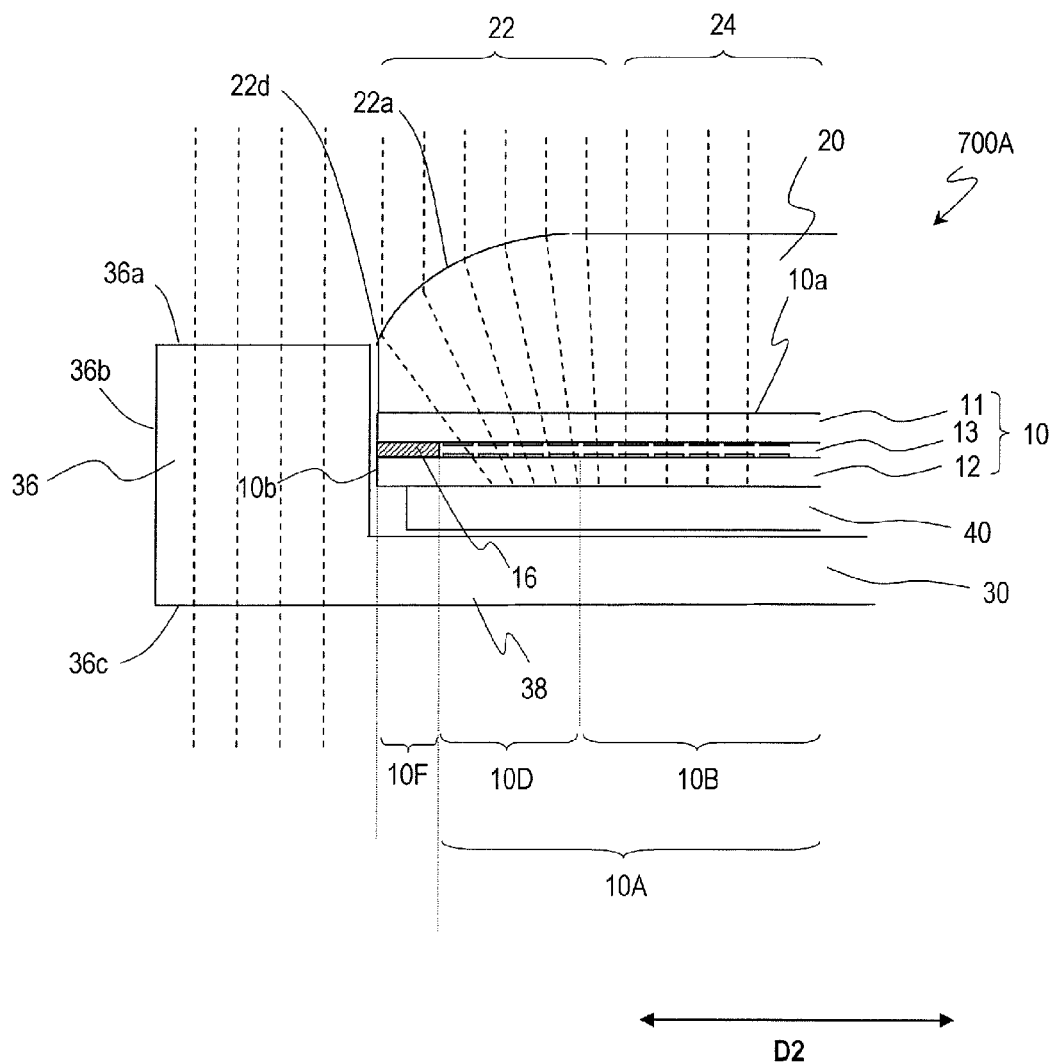

FIG. 24 An enlarged cross-sectional view schematically showing an end portion and the vicinity thereof of the liquid crystal display device 700A.

Figure 25:
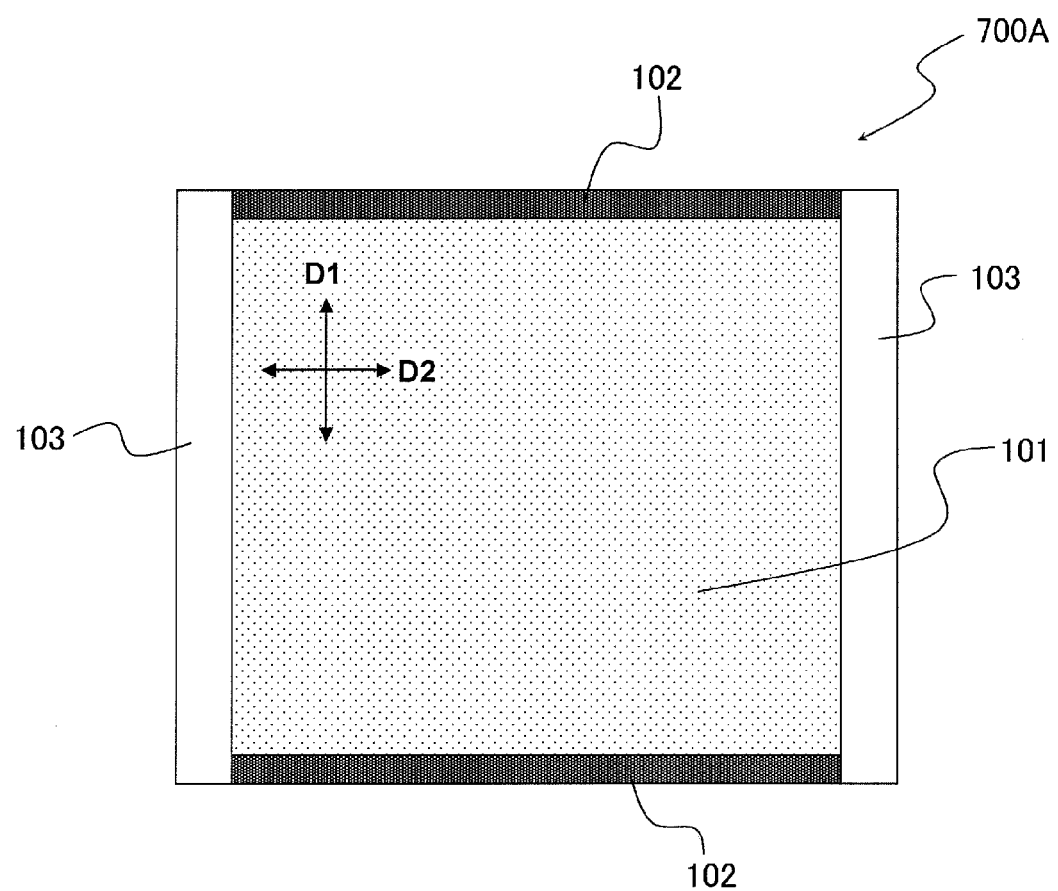

FIG. 25 A diagram schematically showing the liquid crystal display device 700A as seen from the viewer.

DESCRIPTION OF EMBODIMENTS

Hereinafter, embodiments of the present invention will be described with reference to the drawings.

Figure 1:
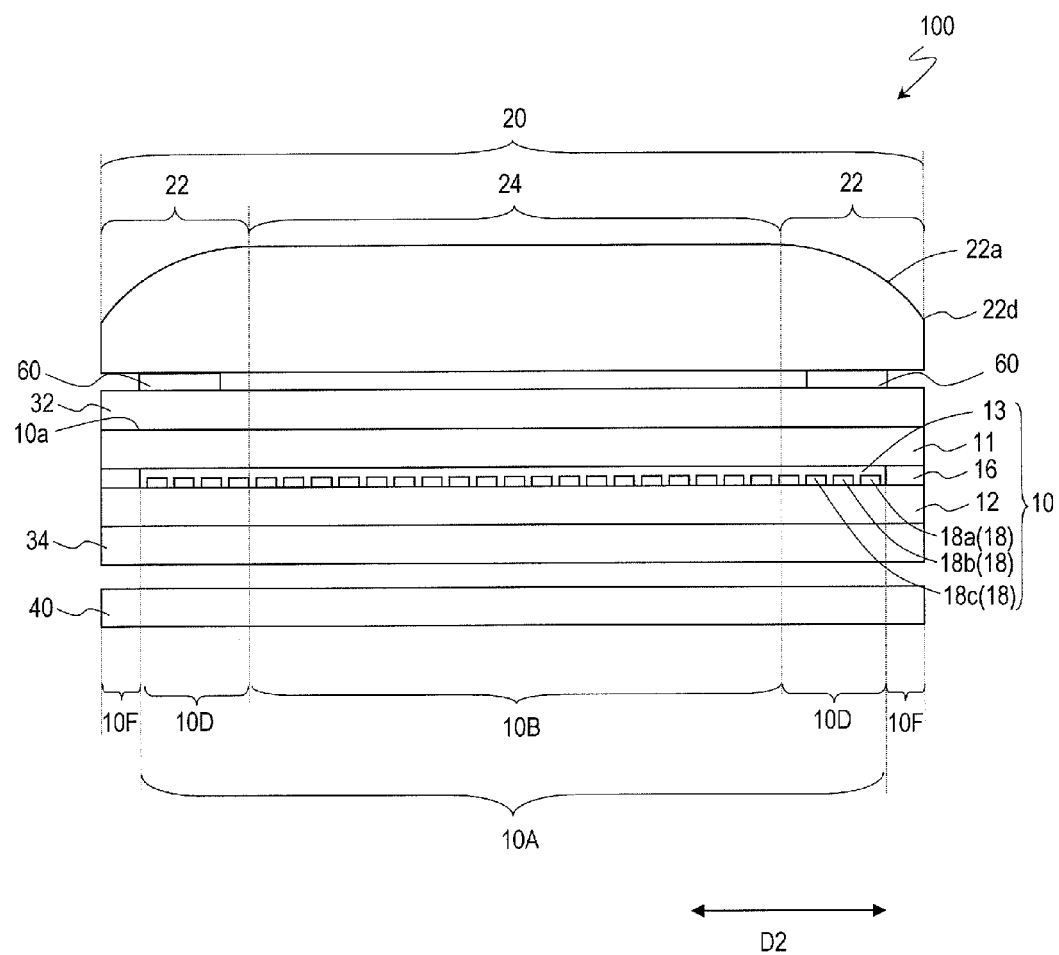
FIG. 1 A schematic cross-sectional view of a liquid crystal display device 100 in an embodiment according to the present invention.

FIG. 1 is a schematic cross-sectional view of a liquid crystal display device 100. As shown in FIG. 1, the liquid crystal display device 100 includes one liquid crystal display panel 10, a light-transmitting cover 20 provided on the viewer's side of the liquid crystal display panel 10, light diffusion structures 60, an upper polarizer plate 32, a lower polarizer plate 34, and a backlight device 40.

The liquid crystal display panel 10 includes a display region 10A and frame regions 10F provided outside the display region 10A. In the display region 10A, a plurality of pixels are located in a matrix, namely, in a row direction and a column direction perpendicular to the row direction. FIG. 1 is a cross-sectional view of the liquid crystal display device 100 taken along a plane perpendicular to the column direction (direction perpendicular to the sheet of FIG. 1; hereinafter, referred to also as the "first direction"). FIG. 1 shows a cross-section of the pixels arrayed in the row direction (direction parallel to the sheet of FIG. 1; hereinafter, referred to also as the "second direction"). In this embodiment, each line of a plurality of pixels arrayed in the column direction will be referred to as the "pixel line". In the display region 10A, a plurality of pixel lines 18 extending in the first direction are arrayed in the row direction. Between the display region 10A and the frame regions 10F, a border extends in the first direction. The plurality of pixel lines 18 include a first pixel line 18a adjoining the border between the display region 10A and the frame regions 10F, a second pixel line 18b adjoining the first pixel line 18a, and a third pixel line 18c adjoining the second pixel line 18b. The first pixel line 18a, the second pixel line 18b and the third pixel line 18c are of different colors from each other. For example, the first pixel line 18a, the second pixel line 18b and the third pixel line 18c are respectively blue, green and red. Namely, the liquid crystal display panel 10 include R, G and B pixels arrayed in vertical stripes.

The light-transmitting cover 20 includes lens portions 22 and a flat portion 24. The lens portions 22 are each located at a position overlapping a region including the frame region 10F of the liquid crystal display panel 10 and a peripheral display region 10D, which is a part of the display region 10A adjoining the frame region 10F. Light going out from each peripheral display region 10D is refracted outward (toward the frame region 10F) by the lens portion 22, so that an image formed in the peripheral display region 10D is enlarged to a region including the peripheral display region 10D and the frame region 10F. The liquid crystal display panel 10 includes the frame regions 10F, but the frame regions 10F can be visually obscured by providing the light-transmitting cover 20 including the lens portions 22 on the viewer's side of the liquid crystal display panel 10. A preferable shape of the lens portions 22 will be described later.

The light diffusion structures 60 are each provided between the corresponding lens portion 22 and a part of the liquid crystal display panel 10 which includes the first pixel line 18a, the second pixel line 18b and the third pixel line 18c. Owing to the light diffusion structures 60, the liquid crystal display device 100 can suppress the sense of unnaturalness given to the viewer by edges 22d of the lens portions 22.

Figure 2:
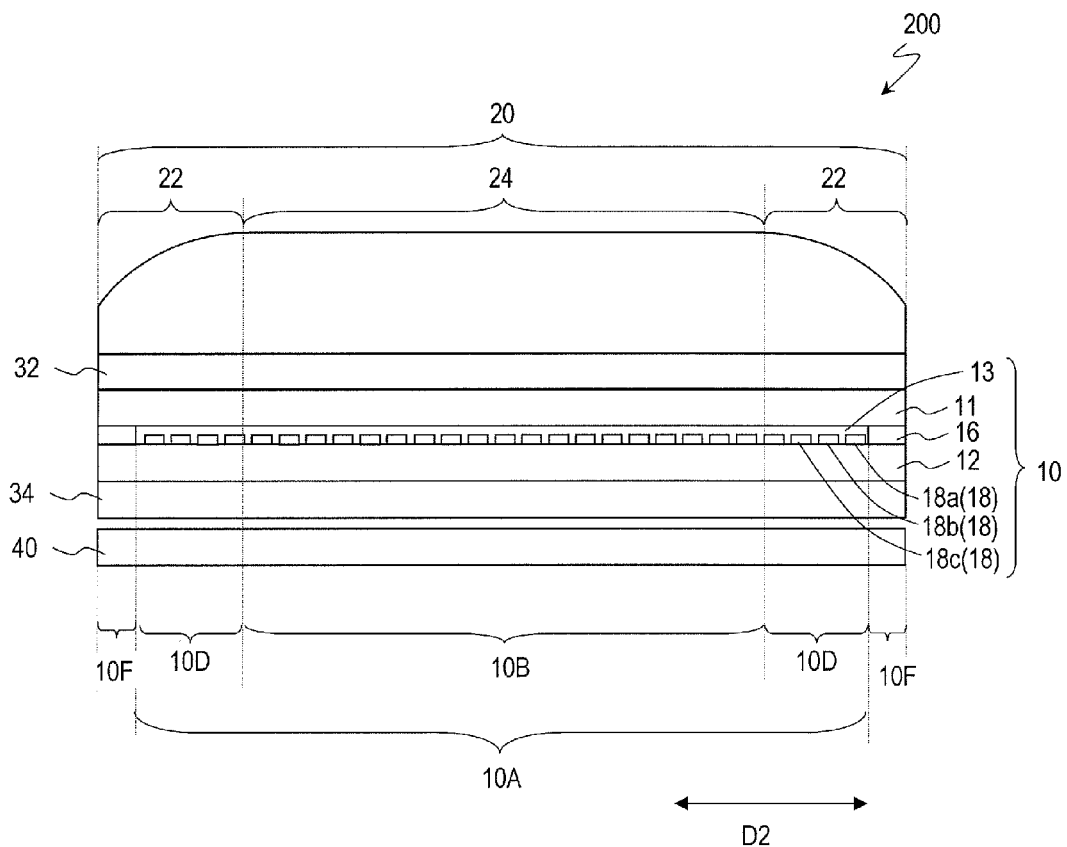
FIG. 2 A schematic cross-sectional view of a liquid crystal display device 200.
Figure 3:
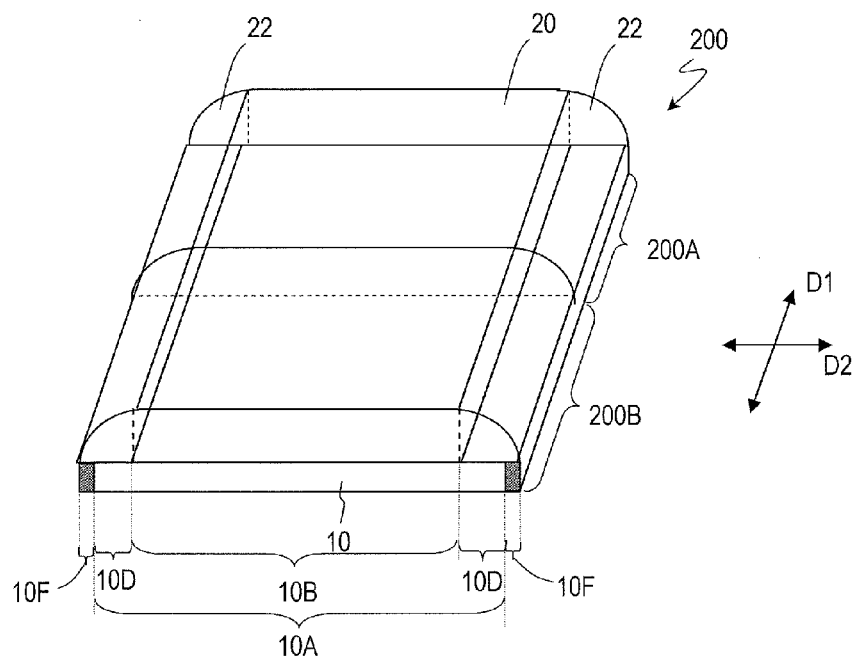
FIG. 3 A schematic perspective view of the liquid crystal display device 200.
Figure 4:
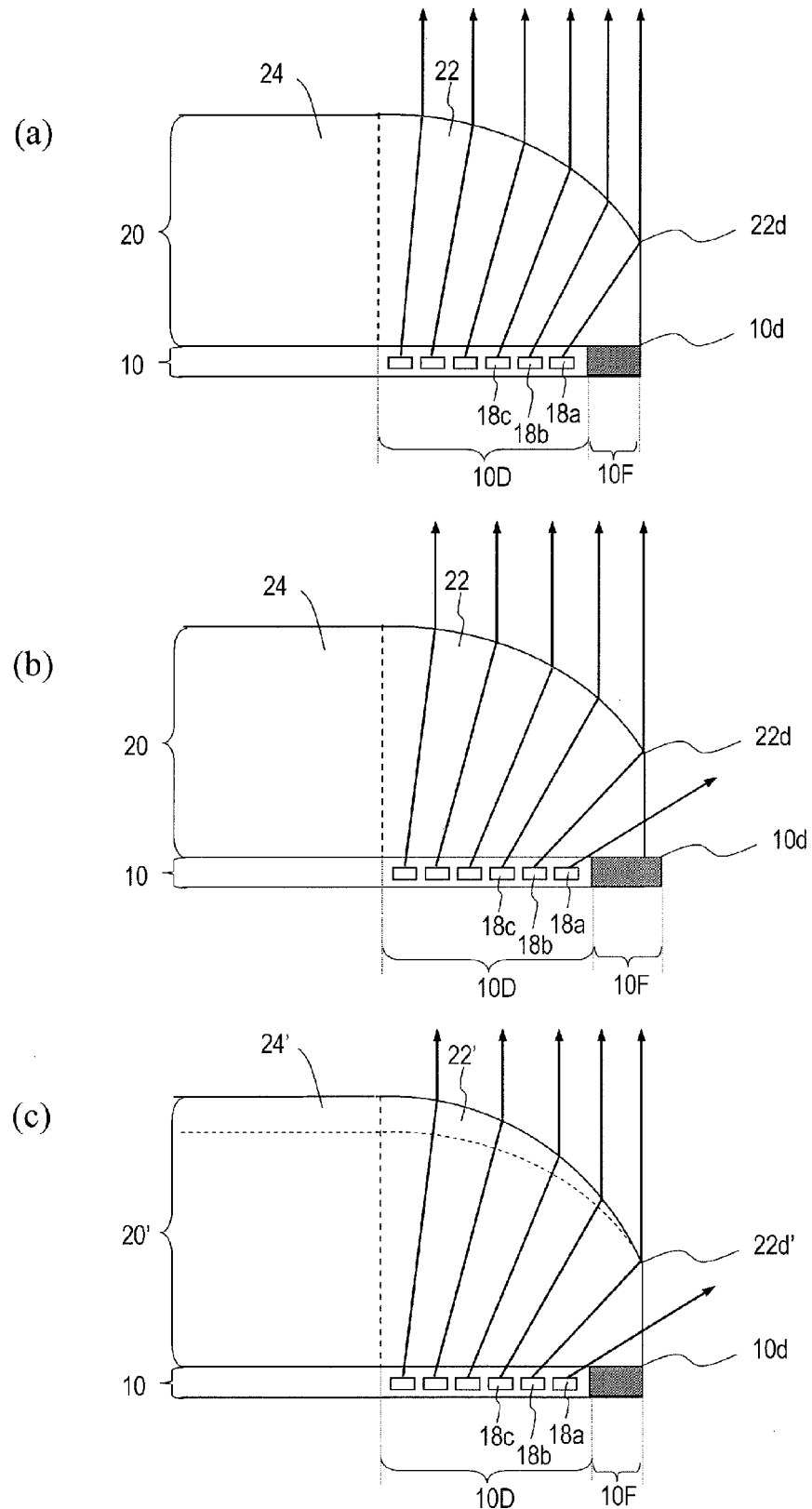
FIG. 4 (*a*) is an enlarged cross-sectional view schematically showing an end portion and the vicinity thereof of a region 200A of the liquid crystal display device 200; and (*b*)

With reference to FIG. 2 through FIG. 4, why a liquid crystal display device 200 with no light diffusion structure gives the viewer a sense of unnaturalness when the position-aligning precision of the light-transmitting cover 20 or the shape precision of the lens portions 22 is low will be described.

FIG. 2 shows a schematic cross-sectional view of the liquid crystal display device 200. FIG. 3 is a schematic perspective view of the liquid crystal display device 200. FIG. 2 is a cross-sectional view of the liquid crystal display device 200 taken along a plane perpendicular to the first direction (direction represented by "D1" in FIG. 3). Unlike the liquid crystal display device 100 shown in FIG. 1, the liquid crystal display device 200 does not have the light diffusion structures 60.

Elements identical to those of the liquid crystal display device 100 will bear the identical reference signs thereto and descriptions thereof will be omitted. Hereinafter, for the sake of explanation, the liquid crystal display device 200 will be divided into two regions along a plane perpendicular to the borders between the display region 10A and the frame regions 10F. As shown in FIG. 3, these two regions will be referred to as the "region 200A" and the "region 200B".

First, with reference to FIGS. 4(a) and (b), the following case will be described: as a result of the light-transmitting cover 20 being shifted in position-aligning in the liquid crystal display device 200, the edge 22d of the lens portion 22 overlaps an edge 10d of the liquid crystal display panel 10 in the region 200A, and the edge 22d of the lens portion 22 is located inside the edge 10d of the liquid crystal display panel 10 in the region 200B.

FIG. 4(a) is a schematic cross-sectional view of one of lens portions 22 and the vicinity thereof in the region 200A of the liquid crystal display device 200. As shown in FIG. 4(a), light coming out from the first pixel line 18a is refracted by the lens portion 22 and goes out from the edge 22d. Therefore, blue light goes out from the edge 22d of the lens portion 22 in the region 200A.

FIG. 4(b) is a schematic cross-sectional view of the lens portion 22 and the vicinity thereof in the region 200B of the liquid crystal display device 200. When the edge 22d of the lens portion 22 is located inside the edge 10d of the liquid crystal display panel 10, as shown in FIG. 4(b), light going out from the second pixel line 18b located inside the first pixel line 18a goes out from the edge 22d of the lens portion 22. Therefore, in the region 200B, green light goes out from the edge 22d of the lens portion 22.

As described above, blue is displayed at the edge 22d of the lens portion 22 in the region 200A, whereas green is displayed at the edge 22d of the lens portion 22 in the region 200B. Different colors are displayed in different parts of the edge 22d, and this gives a sense of unnaturalness to the viewer.

Now, the following case will be described: as a result of the shape precision of an outgoing face of the lens portion 22 in the region 200B being poor, the curvature of the outgoing face of a lens portion 22' in the region 200B is larger than that of the outgoing face of the lens portion 22 in the region 200A (FIG. 4(a)).

FIG. 4(c) is a cross-sectional view of the lens portion 22' and the vicinity thereof in the region 200B. As shown in FIG. 4(c), when the curvature of the outgoing face of the lens portion 22' is larger than that of the outgoing face of the lens portion 22 in the region 200A (represented with the broken line in FIG. 4(c)), light going out from the second pixel line 18b inside the first pixel line 18a goes out from the edge 22d' of the lens portion 22'. Namely, green light goes out from the edge 22d' in the region 200B. By contrast, blue light goes out from the edge 22d of the lens portion 22 in the region 200A, as described above with reference to FIG. 4(a). Different colors are displayed in different parts of the edge 22d, and this gives a sense of unnaturalness to the viewer.

The liquid crystal display device 100 in this embodiment includes the light diffusion structures 60, and suppresses the sense of unnaturalness given to the viewer. The light diffusion structures 60 allow the light incident thereon to go out so as to expand. In other words, the light diffusion structures 60 may be anything which allows the light incident thereon to go out at an angular range larger than the incidence angular range, and may utilize any of scattering, diffuse reflection and refraction of light. As each of the light diffusion structures 60, a light scattering film is usable, for example. A light scattering film includes, for example, a support and an adhesive layer formed on both of two surfaces of the support, and has minute particles mixed in the adhesive layer formed on at least one of the surfaces of the support. Alternatively, as each of the light diffusion structures 60, a lens such as a lenticular lens or the like is usable, for example. Other examples of the light diffusion structures 60 will be described later.

In the liquid crystal display device 100, as shown in FIG. 5, light going out from the first pixel line 18a, the second pixel line 18b and the third pixel line 18c of the liquid crystal display panel 10 passes the light diffusion structure 60 and enters the lens portion 22. Therefore, such light is diffused when entering the lens portion 22. The light diffusion structure 60 allows the light going out from the first pixel line 18a, the second pixel line 18b and the third pixel line 18c to be diffused in the second direction D2 perpendicular to the direction in which the plurality of pixel lines 18 extend (first direction). Blue light, green light and red light incident on the lens portion 22 as being diffused are mixed together. Therefore, a mixed color of blue, green and red is displayed at the edge 22d of the lens portion 22, and the situation where different colors are displayed in different parts of the edge 22d of the lens portion 22 is suppressed. Hence, the liquid crystal display device 100 suppresses the sense of unnaturalness given to the viewer described above.

In the above example, the light diffusion structure 60 is provided on the viewer's side of the three pixel lines. The light diffusion structure 60 may be provided on the viewer's side of, for example, four pixel lines. The colors of the pixel lines do not need to be blue, green and red.

The liquid crystal display panel 10 of the liquid crystal display device 100 may be any known liquid crystal display panel; for example, a TFT-type VA-mode liquid crystal display panel. As shown in FIG. 1, the liquid crystal display panel 100 includes an upper substrate 11, a lower substrate 12, and a liquid crystal layer 13 provided between the upper substrate 11 and the lower substrate 12. The lower substrate 12 includes, for example, TFTs and pixel electrodes. The upper substrate 11 includes, for example, a color filter layer and a counter electrode. The upper polarizer plate 32 is located above the upper substrate 11, and the lower polarizer plate 34 is located below the lower substrate 12. In the frame regions 10F of the liquid crystal display panel 10, a sealing portion 16, driving circuits and the like are formed.

The liquid crystal display device 100 is of a transmission type and includes the backlight device 40. The backlight device 40 is, for example, an edge-light type backlight device which includes an LED, a light guide plate, and an optical sheet, such as a diffuser, a prism sheet or the like.

The display panel is not limited to a liquid crystal display panel, and may be, for example, a display panel for PDP, an organic EL display panel, an electrophoretic display panel, or the like. The upper polarizer plate 32 and the lower polarizer plate 34 may be omitted if not necessary. The liquid crystal display panel 10 of the liquid crystal display device 100 is of a transmission type, and the liquid crystal display device 100 includes the backlight device 40, but the backlight device 40 may be omitted if not necessary.

Now, examples in which the light diffusion structures are provided at other positions will be described. The light diffusion structures 60 in the liquid crystal display device 100 shown in FIG. 1 are each provided in a part of the liquid crystal display panel 10 which includes the first pixel line 18a, the second pixel line 18b and the third pixel line 18c. As in a liquid crystal display device 100A shown in FIG. 6, light diffusion structures 60A may be each provided in a region including the frame region 10F and the peripheral display region 10D. Namely, the light diffusion structures may be each provided in the entire region in which the lens portion 22 is located.

In a display device including a lens portion along each of four sides, the light diffusion structure may be provided in a region along each of two sides where the lens portion is provided, or the light diffusion structure may be provided along each of all the four sides. As described above with reference to FIG. 2 through FIG. 4, when the position-aligning precision of the light-transmitting cover or the shape precision of the lens portion is low, different colors are displayed in different parts of the edge of the lens portion extending in the direction parallel to the pixel lines (first direction D1). Therefore, in the case where the light diffusion structure is to be provided in a region along each of two sides where the lens portion is provided, it is preferable that the light diffusion structure is provided along each of at least two sides parallel to the pixel lines.

In a display device including a display panel of a horizontal stripe type, in which pixels of the same color are arrayed in a direction perpendicular to the first direction D1 (i.e., in the second direction D2), when the position-aligning precision of the light-transmitting cover or the shape precision of the lens portion is low, different colors are displayed in different parts of the edge of the lens portion extending in the second direction D2. Therefore, in such a display device including a display panel having color filters arrayed in horizontal stripes, it is preferable that the light diffusion structure is provided in a region where the lens portion is provided, along each of two sides extending in the second direction D2.

The light diffusion structure may be provided in a region including the display region 10A and the frame region 10F. For example, as in a liquid crystal display device 100B shown in FIG. 7, a light diffusion structure 60B may be provided so as to overlap the entirety of a surface of the upper polarizer plate 32. Namely, the light diffusion structure may be provided in the entire region in which the light-transmitting cover 20 is located.

In a portion in which the light diffusion structure is provided, image blur or reduction of the contrast ratio of display may be conspicuous. Therefore, it is preferable that the light diffusion structure is provided in a small region. The liquid crystal display devices 100 and 100A, in which the light diffusion structures are provided in a small region, are advantageous as compared with the liquid crystal display device 100B.

In the liquid crystal display devices 100, 100A and 100B, the light diffusion structure is provided between the upper polarizer plate 32 and the light-transmitting cover 20. As in a liquid crystal display device 100C shown in FIG. 8, a light diffusion structure 60C may be provided between the upper polarizer plate 32 and the liquid crystal display panel 10. In the case where the light diffusion structure 60C is provided below the upper polarizer plate 32, there is an advantage that external light is less reflected by a surface of the light diffusion structure as compared with the case where the light diffusion structure is provided above the upper polarizer plate 32. By contrast, in a display device including a transmission type display panel (liquid crystal display panel 10) and the backlight device 40 as the liquid crystal display device 100 shown in FIG. 1, in the case where the light diffusion structure 60 is provided above the upper polarizer plate 32, light going out from the backlight device 40 enters the light diffusion structure 60 and is diffused after passing the lower polarizer plate 34, the display panel 10 and the upper polarizer plate 32. Therefore, there is an advantage that the reduction of the contrast ratio of display provided on the transmission structure 60C is provided below the upper polarizer plate 32 as in the liquid crystal display device 100C shown in FIG. 8.

Now, examples of the light diffusion structure will be described.

As the light diffusion structure, a light scattering film is usable as described above. As the light scattering film, a film which includes, for example, a support and an adhesive layer formed on both of two surfaces of the support, and in which the adhesive layer on at least one surface of the support contains minute particles mixed therein, is usable.

When a light scattering film is to be used as the light diffusion structure 60B of the liquid crystal display device 100B which is in contact with a rear surface of the light-transmitting cover 20 and a front surface of the upper polarizer plate 32 as shown in FIG. 7, the light scattering film may be provided as follows, for example.

First, a display panel unit including the liquid crystal display panel 10 and the upper polarizer plate 32 is fixed on a flat stage.

Next, one of the adhesive layers of the light scattering film (hereinafter, referred to also as the "first adhesive layer") is fixed on the front surface of the upper polarizer plate 32. In the case where the first adhesive layer has a protective film which has been subjected to release processing bonded thereto, the light scattering film is bonded to the front surface of the upper polarizer plate 32 while the protective film is released.

Then, the light-transmitting cover 20 fixed on another flat stage is fixed on a surface of the other adhesive layer of the light scattering film (hereinafter, referred to also as the "second adhesive layer"). In the case where the second adhesive layer has a protective film bonded thereto, the protective film is released and then the light-transmitting cover 20 is fixed on the surface of the second adhesive layer. In this manner, the liquid crystal display device 100B including the light scattering film provided in contact with the front surface of the upper polarizer plate 32 and also the rear surface of the light-transmitting cover 20 is obtained.

As the light scattering film, a film which has been subjected to diffusive adhesion produced by Tomoegawa Co., Ltd. is usable, for example.

In the case where the display device does not include the upper polarizer plate 32, the light scattering film may be bonded to the display plane of the liquid crystal display panel 10 in substantially the same method as above. It is preferable that the above-described process is carried out in vacuum so that air bubbles are not mixed between the front surface of the upper polarizer plate 32 (or the display plane of the liquid crystal display panel 10) and the light scattering film or between the light scattering film and the rear surface of the light-transmitting cover 20. After the above-described process, heating or pressurization may be performed in order to increase the adhesiveness between the light scattering film and the light-transmitting cover 20 and the adhesiveness between the light scattering film and the upper polarizer plate 32. In the case where, for example, a light diffusion structure is to be provided on a part of the upper polarizer plate 32 as the light diffusion structure 60A of the liquid crystal display device 100A shown in FIG. 6, a light scattering film formed to have the size of the region in which the light diffusion structure is to be provided may be bonded while being position-aligned. For example, as the light diffusion structure 60A of the liquid crystal display device 100A, a light scattering film formed to have the same size as that of the region in which the lens portion 22 is to be located may be bonded to the position at which the lens portion 22 is to be located, while being position-aligned.

According to the above-described method, one surface (rear surface) of the light scattering film is first fixed on the front surface of the upper polarizer plate 32, and then the light-transmitting cover 20 is fixed on the other surface (front surface) of the light scattering film. Alternatively, the light scattering film may be first fixed on the rear surface of the light-transmitting cover 20 and then fixed on the front surface of the upper polarizer plate 32. Other examples in which the light diffusion structure is first provided on the rear surface of the light-transmitting cover 20 will be described later.

As the light diffusion structure 60B of the liquid crystal display device 100B shown in FIG. 7, a diffusion adhesive layer formed of a diffusion adhesive may be provided to be in contact with the front surface of the upper polarizer plate 32 and the rear surface of the light-transmitting cover 20. A diffusion adhesive is a material formed of an adhesive (resin material) and minute particles, having a different refractive index from that of the adhesive, dispersed in the adhesive. Such a diffusion adhesive is available from, for example, Tomoegawa Co., Ltd.

Regarding the case where a diffusion adhesive layer is used as the light diffusion structure 60B of the liquid crystal display device 100B, the relationship between the haze value and the sense of unnaturalness caused by the edge of the lens portion was evaluated. The haze value was set to 30%, 50% and 70%. Table 1 shows the evaluation results at these haze values together with the evaluation result of a liquid crystal display device with no diffusion adhesive layer. The haze value of the diffusion adhesive layer can be adjusted by, for example, changing the thickness of the diffusion adhesive layer or changing the diameter, refractive index, filling ratio or the like of the minute particles dispersed in the adhesive. The thickness of the diffusion adhesive layer is preferably less than 0.2 mm. When the thickness of the diffusion adhesive layer is equal to or larger than 0.2 mm, a side surface of the diffusion adhesive layer is visible to the viewer, which is not preferable. Also when the thickness of the diffusion adhesive layer is equal to or larger than 0.2 mm, the viewer may sense parallax, which is not preferable. In this example, the thickness of the diffusion adhesive layer was 25 μm.

TABLE 1

| Haze value (%) | Sense of unnaturalness |
|---|---|
| No light diffusion structure | X |
| 30 | Δ |
| 50 | ○ |
| 70 | ○ |

In Table 1, ○ indicates that no sense of unnaturalness was caused, x indicates that a sense of unnaturalness was caused, and Δ indicates that a slight sense of unnaturalness was caused.

As shown in Table 1, in a display device with no light diffusion structure, a sense of unnaturalness was caused. When the haze value was 30%, a slight sense of unnaturalness was caused, but no sense of unnaturalness was caused when the haze value was equal to or larger than 50%. Therefore, the haze value of the diffusion adhesive layer used as the light diffusion structure is preferably equal or larger than 30%. When the haze value was 70%, the display was seen whitish by the reflection of external light and the contrast ratio was confirmed to be reduced. Therefore, the haze value of the diffusion adhesive layer is preferably less than 70%. Even when the haze value was 70%, in a dark room, there was no reflection of external light and the contrast ratio was not confirmed to be reduced.

"Haze value" represents the "degree of cloudiness". The haze value is defined by the following expression in which Tt (%) is the total transmittance and Td (%) is the diffusive transmittance.

$$\text{Haze value}(\%) = (Td/Tt) \times 100$$

The total transmittance Tt is the ratio of the total intensity of the diffusive transmission and the parallel transmission with respect to the intensity of the incident light (parallel light). The diffusive transmittance Td is the intensity ratio of the diffusive transmission with respect to the incident light (parallel light). As the haze value is smaller, the brightness of the light diffusion structure is increased; and as the haze value is larger, the degree of cloudiness of the light diffusion structure is increased. In this example, the haze value of the light diffusion structure was measured by an integrating sphere light transmittance meter (e.g., Haze Meter NDH2000 produced by Nippon Denshoku Industries Co., Ltd.).

A liquid crystal display device including the light diffusion structure 60C provided between the upper polarizer plate 32 and the liquid crystal display panel 10, such as the liquid crystal display device 100C shown in FIG. 8, can also be realized by bonding an optical film stack 70 as shown in FIG. 9 to the display plane of the liquid crystal display panel 10. FIG. 9 is a schematic cross-sectional view of the optical film stack 70. The optical film stack 70 includes the upper polarizer plate 32, a phase film 74 bonded to a bottom surface of the upper polarizer plate 32 via an adhesive layer 72, a light diffusion structure 76, and a protective film 78 provided below the light diffusion structure 76. The protective film 78 has been subjected to release processing. By, for example, bonding the optical film stack 70 to the display plane of the liquid crystal display panel 10 while releasing the protective film 78, the liquid crystal display device 100C including the light diffusion structure 60C provided between the upper polarizer plate 32 and the liquid crystal display panel 10 is obtained. It is preferable that the light diffusion structure 76 is formed of a diffusion adhesive. When being formed of a diffusion adhesive, the light diffusion structure 76 can have both of a function of a light diffusion structure and a function of an adhesive layer. Therefore, an adhesive layer does not need to be formed separately and thus the cost can be reduced. In the case where the phase film 74 is to be omitted, an optical film stack in which a light diffusion structure formed of a diffusion adhesive is provided below the upper polarizer plate 32 is usable.

As described above, the light diffusion structure may be provided on the rear surface of the light-transmitting cover 20 in advance. For example, the light diffusion structure may be provided by applying the above-described diffusion adhesive to the rear surface of the light-transmitting cover 20 in advance. In the case where the light diffusion structure is to be provided on the rear surface of the light-transmitting cover 20 in advance, a light-transmitting cover 20F having a convexed and concaved rear surface shown in FIG. 10 may be used instead of the light diffusion structure being provided as a separate member. As shown in FIG. 10, the light-transmitting cover 20F includes lens portions 22F and a flat portion 24F. A convexed and concaved structure is formed in rear surfaces 26F of the lens portions 22F and a rear surface 28F of the flat portion 24F. As the convexed and concaved structure, a convexed and concaved structure exhibiting an anti-glare function may be formed, for example. The convexed and concaved structure exhibiting an anti-glare function may be formed by, for example, applying a resin containing particles having a diameter of several micrometers to the rear surfaces 26F and 28F. The light-transmitting cover 20F may be produced by, for example, injection molding by use of a mold having a convexed and concaved structure which is an inversion of the convexed and concaved structure of the rear surfaces 26F of the lens portions 22F and the rear surface 28F of the flat portion 24F. Alternatively, the light-transmitting cover 20F may be obtained by preparing a light-transmitting cover having a flat rear surface and forming a convexed and concaved structure by sandblasting.

For providing light diffusion structures only in regions in which the lens portions are provided, a light-transmitting cover 20G shown in FIG. 11 having a convexed and concaved structure only in rear surfaces 26G of lens portions 22G is usable. The light-transmitting cover 20G is usable for a display device including the light diffusion structures 60B only in the regions in which the lens portions 22 are provided, such as the liquid crystal display device 100B. When a light-transmitting cover having a light diffusion structure formed therein in advance such as the light-transmitting cover 20G is used, there is an advantage that the position-aligning is not necessary as compared with the case where the light-transmitting cover and the light diffusion structure are provided as separate members.

The light-transmitting cover 20G may be produced by, for example, as shown in FIG. 12, injection molding by use of an upper mold 92 having a shape which is an inversion of the shape of a viewer-side surface of the light-transmitting cover 20G and a lower mold 94 having a convexed and concaved structure in regions corresponding to the lens portions 22G of the light-transmitting cover 20G. The convexed and concaved structure of the lower mold 94 may be formed by, for example, sandblasting or etching.

The light-transmitting cover 20G may also be produced by performing sandblasting on a light-transmitting cover having a flat rear surface. First, as shown in FIG. 13(a), a light-transmitting cover 20G' having a flat rear surface is prepared. Then, as shown in FIG. 13(b), a resist 96 is formed on a rear surface of a flat portion 24G'. Next, as shown in FIG. 13(c), a convexed and concaved structure is formed on the rear surfaces 26G of the lens portions 22G by sandblasting. Then, the resist 96 is released from the rear surface of the flat portion 24G'. In this manner, the light-transmitting cover 20G shown in FIG. 11 is obtained.

The degree of expansion of angular distribution of light going out from the light diffusion structure 60 will be referred to as the "light diffusion degree". The light diffusion degree can be evaluated by use of, for example, the full width at half maximum (FWHM) of the intensity distribution of light going out from the light diffusion structure 60. The "full width at half maximum" means the angular width at which the intensity of outgoing light is ½ of the intensity of the outgoing light in the normal direction.

As the light diffusion structure, a light diffusion structure having anisotropy in the "light diffusion degree" described above is also usable. In the present invention, "having anisotropy in the light diffusion degree" means that the light diffusion degrees in two directions intersecting each other are different from each other.

FIG. 14 is a schematic perspective view of a liquid crystal display device 100H including light diffusion structures 60H (represented with hatching) having anisotropy in the light diffusion degree. The liquid crystal display device 100H includes a light-transmitting cover 20 having lens portions 22 parallel to the first direction D1 and a liquid crystal display panel 10. The light diffusion structures 60H are each provided in a region in which the lens portion 22 is located. The light diffusion degree of the light diffusion structure 60H in the second direction D2 is higher than the light diffusion degree thereof in the first direction D1. Although not shown in FIG. 14, a plurality of pixel lines extending in the first direction are arrayed in the display region of the liquid crystal display panel 10 of the liquid crystal display device 100H, like in the liquid crystal display device 100 shown in FIG. 1. The plurality of pixel lines are arrayed so as to adjoin each other in the second direction D2 perpendicular to the first direction D1.

FIG. 14 schematically shows a light ray going out from each light diffusion structure 60H. FIG. 14 schematically shows light entering the light diffusion structure 60H provided along the left side in FIG. 14, among two sides of the liquid crystal display device 100H extending in the second direction D2, and diffused in the first direction D1 and also shows light entering the light diffusion structure 60H provided along the right side in FIG. 14 and diffused in the second direction D2. As shown in FIG. 14, the angular range of the light going out from the light diffusion structures 60H is larger in the second direction D2 than in the first direction D1. As described above with reference to FIG. 5, a light diffusion structure can suppress the sense of unnaturalness by diffusing the light incident thereon in the direction (second direction D2) perpendicular to the direction in which the pixel lines extend (first direction D1). In the case of the light diffusion structures 60H, the light diffusion degree is higher in the second direction D2 (row direction) than in the first direction D1, and therefore the sense of unnaturalness can be suppressed effectively.

As the light diffusion structure 60H having anisotropy in the light diffusion degree, a lenticular lens is usable, for example. As the lenticular lens, a lenticular lens produced by Nihon Tokushu Kogaku Jushi Co., Ltd. is usable, for example. FIG. 15 is a schematic perspective view of the light diffusion structure 60H formed by use of a lenticular lens. As shown in FIG. 15, the light diffusion structure 60H formed by use of a lenticular lens has a structure in which a plurality of semicylindrical lenses 80 (hereinafter, referred to also as the "lenses 80") are arrayed parallel to each other. The lenticular lens can diffuse light by refraction. The light diffusion degree of a semicylindrical lens 80 is different in a longitudinal axial direction of the semicylindrical lens 80 from in a direction perpendicular to the longitudinal axial direction. The light diffusion degree in the direction perpendicular to the longitudinal axial direction is higher than that in the longitudinal axial direction. Therefore, as shown in FIG. 15, by locating the light diffusion structure 60H such that the longitudinal axial direction of the semicylindrical lenses 80 matches the first direction D1, the sense of unnaturalness can be suppressed effectively.

As the light diffusion structure 60H formed by use of a lenticular lens, a lens sheet having the shape of a lenticular lens is usable, for example. Alternatively, a light-transmitting cover having a rear surface of the shape of a lenticular lens may be used, like the light-transmitting cover 20G having a convexed and concaved structure in the rear surface. The light-transmitting cover having a rear surface of the shape of a lenticular lens may be produced by, for example, injection molding.

Table 2 shows results of an experiment performed to find a preferable size of pitch $P_0$ of the lens 80. As shown in FIG. 15, the pitch $P_0$ of the lens 80 is a width of the lens 80 in the direction (second direction D2) perpendicular to the longitudinal axial direction of the lens 80 (first direction D1). Regarding display devices in which the pitch $P_0$ was set to three values of 0.02 mm, 0.03 mm and 0.04 mm, it was evaluated whether or not a sense of unnaturalness was caused. For the display devices having the three different pitches, the radius of curvature of the lenses 80 was 0.02 mm, and the pitch $P_O$ was changed by changing the central angle. ○, Δ and x indicate the same as in Table 1.

TABLE 2

| Pitch (mm) | Sense of unnaturalness |
|---|---|
| 0.02 | Δ |
| 0.03 | ○ |
| 0.04 | ○ |

As shown in Table 2, when the pitch was 0.02 mm, a slight sense of unnaturalness was caused, but no sense of unnaturalness was caused when the pitch was equal to or larger than 0.03 mm. Therefore, when a lenticular lens is to be used as the light diffusion structure 60H, the pitch of the lenses is preferably equal to or larger than 0.02 mm and is more preferably equal to or larger than 0.03 mm.

As the light diffusion structure having anisotropy in the light diffusion degree, a lens diffuser having, in a surface thereof, a convexed and concaved structure formed to provide different light diffusion degrees in two directions intersecting each other is also usable. As such a lens diffuser, a lens diffuser available from Luminit LLC is usable. The lens diffuser of Luminit LLC has a micrometer-level convexed and concaved structure formed in a surface thereof, and can diffuse light by refraction. The lens diffuser of Luminit LLC causes the light diffusion degree to be different between two directions intersecting each other by the shape of the convexed and concaved structure.

As the light diffusion structure having anisotropy in the light diffusion degree, a rod-like molecule aligned film having different light diffusion degrees in two directions perpendicular to each other is also usable. As the rod-like molecule aligned film, an anisotropic scattering film described in Japanese Laid-Open Patent Publication No. 2007-10798 is usable, for example. The anisotropic scattering film described in Japanese Laid-Open Patent Publication No. 2007-10798 has a sea-island structure formed of at least two types of noncompatible resins. In the sea-island structure, rod-like island phases are aligned in one direction in at least a surface layer of the film. As a combination of noncompatible resins, a combination of an olefin-based resin and a polyester-based resin is usable, for example. Regarding the anisotropic scattering film described in Japanese Laid-Open Patent Publication No. 2007-10798, the light diffusion degree is higher in the direction perpendicular to the direction in which the island phases are aligned than in the direction in which the island phases are aligned.

As the rod-like molecule aligned film, an anisotropic scattering sheet described in Japanese Laid-Open Patent Publication No. 2006-251395 is also usable. The anisotropic scattering sheet described in Japanese Laid-Open Patent Publication No. 2006-251395 includes an anisotropic light scattering layer having a continuous phase and dispersed phases different from each other in the refractive index. The dispersed phases have an aspect ratio larger than 1 and are provided such that the longitudinal direction of the dispersed phases is in one direction. Regarding the anisotropic scattering sheet described in Japanese Laid-Open Patent Publication No. 2006-251395, the light diffusion degree is higher in the direction perpendicular to the longitudinal direction of the dispersed phases than in the longitudinal direction of the dispersed phases.

The light diffusion structure may include a low light diffusion region on the display region 10A side. The low light diffusion region is formed such that the light diffusion degree is increased step by step from the display region 10A side toward the frame region 10F side. FIG. 16 is a schematic cross-sectional view of a liquid crystal display device 100I including light diffusion structures 60I each having a low light diffusion region 62. The light diffusion structures 60I each include the low diffusion region 62 provided on the display region 10A side and a high light diffusion region 64 provided outside the low diffusion region 62 (on the frame region 10F side). The low light diffusion region 62 includes a first low diffusion region 62a provided on the display region 10A side and a second low diffusion region 62b provided on the frame region 10F side with respect to the first low diffusion region 62a and providing a higher light diffusion degree than the first low diffusion region 62a. The light diffusion degree of the high light diffusion region 64 is higher than the light diffusion degree of the second low diffusion region 62b.

The region in which the light diffusion structure is provided has a lower contrast ratio of display than the region in which the light diffusion structure is not provided. Therefore, in the case where there is a border between the region in which the light diffusion structure is provided and the region in which the light diffusion structure is not provided, a difference in the contrast ratio may be conspicuous at the border. The light diffusion structure 60I of the liquid crystal display device 100I includes the low light diffusion region 62 and therefore can reduce the difference in the light diffusion degree between the region with the light diffusion structure and the region without the light diffusion structure. Thus, the difference in the contrast ratio at the border between the region with the light diffusion structure and the region without the light diffusion structure can be made less conspicuous.

As the light diffusion structure 60I, a lenticular lens having different pitches in different regions is usable. FIGS. 17(a), (b) and (c) are schematic cross-sectional views of the first low light diffusion region 62a, the second low light diffusion region 62b and the high light diffusion region 64 of the light diffusion structure 60I, respectively. In the first low light diffusion region 62a, the second low light diffusion region 62b and the high light diffusion region 64 of the light diffusion structure 60I, a plurality of semicylindrical lenses 82a, a plurality of semicylindrical lenses 82b and a plurality of semicylindrical lenses 84 are arrayed, respectively. The semicylindrical lenses 82a, 82b and 84 have the same radius of curvature but different pitches (width in the direction perpendicular to the longitudinal direction). As shown in FIGS. 17(a), (b) and (c), the pitches of the semicylindrical lenses 82a, 82b and 84 are respectively represented as $P_{2a}$, $P_{2b}$ and $P_4$. When the pitches are set to $P_{2a}<P_{2b}<P_4$, the light diffusion degree can be increased step by step from the display region 10A side toward the frame region 10F side. For example, the radius of curvature may be set to 0.02 mm, and the pitches may be set to $P_{2a}=0.02$ mm, $P_{2b}=0.03$ mm, and $P_4=0.04$ mm.

The light diffusion structure 60I shown in FIG. 17 is configured such that the light diffusion degree increases in three steps. The light diffusion structure according to the present invention is not limited to this. For example, the light diffusion degree of the second low light diffusion region 62b may be made equal to the light diffusion degree of the high light diffusion region 64, so that the light diffusion degree is increased in two steps. Alternatively, the light diffusion structure may be configured such that the light diffusion degree increases in four steps, or increases continuously. As the light diffusion structure for allowing light diffusion degree to increase continuously, a lenticular lens in which the pitch of the semicylindrical lenses is continuously changed is usable, for example.

The light diffusion degree can be changed continuously or step by step by changing the radius of curvature of the semi-cylindrical lenses of the lenticular lens continuously or step by step. It is easier to change the pitch than changing the radius of curvature because lenses of different pitches can be produced by the same cutting tool.

The difference in the contrast ratio of display can be made less conspicuous also by, for example, changing the haze value of the diffusion adhesive layer continuously or step by step. For example, in the above-described light diffusion structure 60I, a plurality of diffusion adhesive layers having different haze values may be provided such that the haze values of the first low light diffusion region 62a, the second low light diffusion region 62b and the high light diffusion region 64 are increased in this order (i.e., haze value of the first low light diffusion region 62a<haze value of the second low light diffusion region 62b<haze value of the high light diffusion region 64).

<Shape of the Lens Portion>

Now, the shape of a viewer-side surface 22a of the lens portion 22 will be described. The viewer-side surface (referred to also as the "front surface") 22a of the lens portion 22 is a lens surface configured to refract light going out from the pixels arrayed in the peripheral display region 10D toward the viewer's side. For example, a line of intersection between the viewer-side surface 22a of the lens portion 22 and a plane which is perpendicular to the display plane 10a of the liquid crystal display panel 10 and intersects the first direction D1 perpendicularly is a circular arc. The line of intersection between the viewer-side surface 22a and the plane which is perpendicular to the display plane 10a and intersects the first direction D1 perpendicularly may be a curve which is not a circular arc. In particular, such a line of intersection is preferably a curve which is defined by an aspherical function described in WO2009/157150. The entire disclosure of WO2009/157150 is incorporated herein by reference.

For example, an image to be formed in the peripheral display region 10D may be formed at an image compression rate "a" relative to an image to be formed in a central display region 10B, and thus the image formed in the peripheral display region 10D can be displayed as enlarged by 1/a times on the viewer-side surface 22a of the lens portion 22. The shape of the viewer-side surface 22a of such a lens portion 22 can be found as follows.

The following function is used as the aspherical function f(x):

$$f(x)=h-cx^2/(1+(1-(1+k)c^2x^2)^{1/2})+A_4x^4+A_6x^6+A_8x^8+A_{10}x^{10}$$

where c: curvature of the lens portion 22 (inverse of the radius of curvature), h: thickness of the flat portion 24, and k: conic constant.

x represents the position of each point on the viewer-side surface 22a of the lens portion 22 along the second direction D2. The value of x is zero (0) on the central display region 10B side, and increases as becoming closer to the frame region 10F.

For example, where width L1 of the peripheral display region 10D: 12 mm, width L2 of the frame region 10F: 3 mm, image compression rate a: 0.8, thickness h of the flat portion 24: 13 mm, radius of curvature (inverse of the curvature c of the lens portion 22; i.e., 1/c): 23 mm, and refractive index n of the lens portion 22: 1.49 (acrylic resin);

$k=1.15$, $A_4=-7.86\times^{-7}$, $A_6=1.89\times10^{-8}$, $A_8=-1.62\times10^{-10}$, and $A_{10}=4.95\times10^{-13}$.

The value of k is given by the following expression.

$$k=89.918a^4-194.57a^3+159.82a^2-57.099a+7.1865$$

When the image compression rate is small (e.g., a<0.7), the value of 1/a is large and each pixel is greatly enlarged. This may make the black matrix between adjoining pixels conspicuous, often resulting in inferior display. A large image compression rate (e.g., a>0.9) is not very preferable because this requires a lens portion which is large for the width of the frame region. For example, when the image compression rate a=0.95, a=L1/(L1+L2)=0.95. Thus, the width of the lens portion, (L1+L2), is 20 times the width L2 of the frame region. When the width L2 of the frame region is 3 mm as in the above example, the width of the lens portion, i.e., L1+L2, is 60 mm. For example, many of display devices for use in mobile phones have a device width equal to or less than 60 mm, and therefore cannot have a lens member having a lens portion width (L1+L2) of 60 mm located therein. Thus, the image compression rate "a" is preferably about 0.7 to 0.9. Based on the above expression, the values of conic constant k for the image compression rate a=0.7 and 0.9 are calculated to be k≈0.38 and 2.4, respectively. Thus, a preferred range of the conic constant k is 0.38 or larger and 2.4 or less.

The above aspherical function f(x) may be found using the above value of k, and the lens portion 22 having the viewer-side surface 22a represented by f(x) may be produced. Thus, an undistorted image can be displayed in the peripheral display region 10D and the frame regions 10F.

The liquid crystal display devices in the above-described embodiments all have one liquid crystal display panel. A liquid crystal display device in an embodiment according to the present invention is not limited to such examples, and may include a plurality of tiled liquid crystal display panels.

FIG. 18 is a schematic cross-sectional view of a direct-viewing type liquid crystal display device 500A in an embodiment according to the present invention. The liquid crystal display device 500A includes a plurality of tiled liquid crystal display panels, namely, two liquid crystal display panels 10 and 10'. In the liquid crystal display device in this example, the liquid crystal display panels 10 and 10' are located so as to adjoin each other. Instead of the liquid crystal display panels 10 and 10', a liquid crystal display unit having the liquid crystal display panel 10 accommodated in a housing and a liquid crystal display unit having the liquid crystal display panel 10' accommodated in a housing may be located so as to adjoin each other.

The liquid crystal display panels 10 and 10'respectively include display regions 10A and 10A' each having a plurality of pixels arrayed therein, and frame regions 10F and 10F' outside the display regions 10A and 10A'. Regions which do not contribute to display will be collectively referred to as the "non-display region 10FF". The non-display region 10FF includes the frame regions 10F and 10F'. In the case where there are gaps therebetween or connection sections, these gaps and connection sections are also included in the non-display region 10FF. In each of the display regions 10A and 10A' of the liquid crystal display panels 10 and 10', a plurality of pixels are located in a matrix in a first direction (direction vertical to the sheet of FIG. 18) and a second direction perpendicular to the first direction and parallel to display planes 19 and 19' of the display panels 10 and 10' (direction represented as D2 in FIG. 18). The pixels are arrayed at an equal pitch in each of the first direction and the second direction.

The liquid crystal display panel 10 includes an upper substrate 11, a lower substrate 12, and a liquid crystal layer 13 provided between the upper substrate 11 and the lower substrate 12. The upper substrate 11 includes, for example, a color filter layer and a counter electrode. The lower substrate 12 includes, for example, transparent electrodes formed in a matrix, TFTs, bus lines, driving circuits for supplying signals to these elements, and the like. In the frame region 10F of the liquid crystal display panel 10, a sealing portion 16 for holding the liquid crystal layer 13 between the upper substrate 11 and the lower substrate 12, driving circuits for driving the pixels and the like are included. Like the liquid crystal display panel 10, the liquid crystal display panel 10' includes an upper substrate 11', a lower substrate 12', a liquid crystal layer 13', and a sealing portion 16'.

On the viewer's side of the liquid crystal display panels 10 and 10', light-transmitting covers 14 and 14' are respectively located. The light-transmitting covers 14 and 14' respectively include lens portions 141 and 141' and flat portions 142 and 142'. The lens portions 141 and 141' are different from the flat portions 142 and 142' in the shape of the view-side surface.

The lens portion 141 is located so as to stride over a border extending in the first direction between the display region 10A and the frame region 10F of the liquid crystal display panel 10. Similarly, the lens portion 141' is located so as to stride over a border extending in the first direction between the display region 10A' and the frame region 10F' of the liquid crystal display panel 10'. In other words, the lens portion 141 is located on the viewer's side of a region which includes a part of the frame region 10F and a part of a peripheral display region 10D in the display region 10A, the part adjoining the part of the frame region 10F in the second direction D2. Similarly, the lens portion 141' is located on the viewer's side of a region which includes a part of the frame region 10F' and a part of a peripheral display region 10D' in the display region 10A', the part adjoining the part of the frame region 10F' in the second direction D2.

Light going out from the pixels arrayed in central display regions 10B and 10B' of the liquid crystal display panels 10 and 10' enters the flat portions 142 and 142', travels straight through the flat portions 142 and 142' in a direction perpendicular to the display planes 19 and 19' of the liquid crystal display panels 10 and 10', goes out toward the viewer' side, and travels in the direction perpendicular to the display planes 19 and 19'. Light going out from the pixels arrayed in the peripheral display regions 10D and 10D' enters the lens portions 141 and 141', is refracted outward (toward the border between the liquid crystal display panels 10 and 10'), goes out toward the viewer' side, and travels in the direction perpendicular to the display planes 19 and 19'. The light going out from the peripheral display regions 10D and 10D' of the liquid crystal display panels 10 and 10' is refracted in this manner, so that an image is displayed on a front surface of the frame regions 10F and 10F'. Hence, the frame regions 10F and 10F', namely, the non-display region 10FF, which would otherwise appear in the image as a joint between the tiled liquid crystal display panels, can be visually obscured.

The shape of a surface of each of lens portions 141 and 141' of the light-transmitting covers 14 and 14' is, for example, designed to be substantially the same as the shape of the surface of the lens 22 of the light-transmitting cover 20 shown in FIG. 1. For example, the lens portions 141 and 141' are designed such that lines of intersections 1412 and 1412' between viewer-side surfaces 1411 and 1411' of the lens portions 141 and 141' and a plane perpendicular to the display planes 19 and 19' of the liquid crystal display panels 10 and 10' and intersecting the first direction perpendicularly are curves defined by the aspherical function described in WO2009/157150 mentioned above (see WO2009/157150).

For example, the liquid crystal display device 500A may be used instead of the liquid crystal display panel 10 and the light-transmitting cover 20 of the liquid crystal display device 100 shown in FIG. 1; the shape of the frame regions of the light-transmitting covers 14 and 14' may be made the same as that of the lens portion 22; and a light diffusion structure may be provided between the liquid crystal display panel and the light-transmitting cover. With such a structure, a direct-viewing type liquid crystal display device including tiled liquid crystal display panels, in which the frame is visually obscured and thus the sense of unnaturalness is suppressed, can be obtained.

As in a liquid crystal display device 500B shown in FIG. 19, liquid crystal display devices 500a may be tiled in two directions. FIG. 19 is a schematic plan view of the liquid crystal display device 500B in an embodiment according to the present invention. FIGS. 20(a) and (b) each show a structure of the liquid crystal display device 500a used in the liquid crystal display device 500B. FIG. 20(a) is a schematic plan view, and FIG. 20(b) is a schematic cross-sectional view taken along line 20B-20B' in FIG. 20(a). FIG. 21 is a schematic top view of an end portion of a liquid crystal display panel 500, and FIG. 22 is a schematic cross-sectional view of an end portion of the liquid crystal display device 500a.

By tiling the liquid crystal display devices 500a in two directions, i.e., a vertical direction and a horizontal direction (2×2), the liquid crystal display device 500B having a large screen shown in FIG. 19 can be obtained. In FIG. 19, a curved shape of a lens portion of a light-transmitting cover located on each liquid crystal display device 500a is represented with contour lines.

In order to realize jointless display with the liquid crystal display device 500B, it is preferable that borders in the horizontal direction (first direction D1) and the vertical direction (second direction D2) with respect to a display region 520 of each liquid crystal display panel 500, and also a non-display region 538 (represented with bold hatching in FIG. 19) in a corner portion which is not included in any of borders, are visually obscured. In order to visually obscure the non-display region 538, a light-transmitting cover having a lens portion of a shape represented by, for example, a part of a body of revolution may be provided on the corner portion of each liquid crystal display panel 500 (see Japanese Patent Application No. 2008-322964). The entire disclosure of Japanese Patent Application No. 2008-322964 is incorporated herein by reference. Hereinafter, with reference to FIG. 20 through FIG. 22, the structure of the liquid crystal display device 500a will be described.

As shown in FIGS. 20(a) and (b), the liquid crystal display device 500a includes the liquid crystal display panel 500 and a light-transmitting cover 600 located on the viewer's side of the liquid crystal display panel 500. The liquid crystal display panel 500 includes the display region 520 in which a plurality of pixels are arrayed in a matrix of rows and columns, and a frame region 530 provided outside the display region 520.

The display region 520 includes a peripheral display region 525 adjoining the frame region 530 and a central display region 524, which is a region other than the peripheral display region 525. The light-transmitting cover 600 includes a flat portion 650 and a lens portion 610.

The peripheral display region 525 of the liquid crystal display panel 500 refers to a region in the display region 520, which has the lens portion 610 of the light-transmitting cover 600 located on the viewer's side thereof. The flat portion 650 is located on the central display region 524. By allowing light going out from the peripheral display region 525 to be refracted by the lens portion 610, an image formed in the peripheral display region 525 is enlarged to a region including the peripheral display region 525 and the frame region 530.

Now, where the row direction is designated as the first direction D1 and the column direction as the second direction D2, there exist a first border line B1 extending in the first direction D1 and a second border line B2 intersecting the first border line B1 and extending in the second direction D2, both between the display region 520 and the frame region 530. Between the peripheral display region 525 and the central display region 524, there exist a third border line B3 extending in the first direction D1 and a fourth border line B4 intersecting the third border line B3 and extending in the second direction D2.

The peripheral display region 525 includes a first peripheral display section 521 surrounded by a straight line L1 passing through a point C, at which the third border line B3 and the fourth border line B4 intersect each other, and perpendicularly intersecting the first border line B1, a straight line L2 passing through the point C and perpendicularly intersecting the second border line B2, the first border line B1, and the second border line B2.

The frame region 530 includes a first frame portion 531 adjoining the first peripheral display section 521 along the first border line B1 or the second border line B2. The first frame portion 531 is a portion defined by the first border line B1, the second border line B2, the straight line L1, the straight line L2, and an outer edge of the liquid crystal display panel 500.

The lens portion 610 of the light-transmitting cover 600 has a curved surface as shown in FIG. 20(b). FIG. 20(a) shows the curved surface (viewer-side surface) of the lens portion 610 with contour lines. In this example, the contour lines are shown at a constant interval for the sake of simplicity, but the present invention is not limited to this. A preferable shape of the viewer-side surface of the lens portion 610 will be described later in detail.

The lens portion 610 of the light-transmitting cover 600 of the liquid crystal display device 500a refracts light going out from the first peripheral display section 521 to enlarge an image formed in the first peripheral display section 521 to a region including the first peripheral display section 521 and the first frame portion 531. Specifically, as shown in FIG. 20(a), the lens portion 610 refracts light, going out from a pixel 571 in the first peripheral display section 521, in a direction X1 from the point C toward the pixel 571. Similarly, light going out from each pixel in the first peripheral display section 521 is refracted in a direction from the point C toward that pixel. When observed from a direction perpendicular to the display plane of the liquid crystal display device 500a, an image formed in the first peripheral display section 521 of the liquid crystal display panel 500 is displayed in enlargement in the region including the first peripheral display section 521 and the first frame portion 531. That is, a part of the lens portion 610 which is located on the first peripheral display section 521 and the first frame portion 531 refracts light, going out from the first peripheral display section 521, in a direction which is neither the horizontal direction D1 nor the vertical direction D2 (e.g., refracts the light in the direction X1) to visually obscure the first frame portion 531.

Hereinafter, this will be described in more detail with reference to FIG. 21 and FIG. 22.

FIG. 21 is a top view schematically showing, in enlargement, the corner portion and a vicinity thereof of the liquid crystal display panel 500. As shown in FIG. 21, the first border line B1 and the second border line B2 exist between the display region 520 and the frame region 530, whereas the third border line B3 and the fourth border line B4 exist between the peripheral display region 525 and the central display region 524. The first peripheral display section 521 is surrounded by the straight line L1, the straight line L2, the first border line B1 and the second border line B2. The first frame portion 531 is a part of the frame region 530 which is surrounded by the straight line L1, the straight line L2, the first border line B1, the second border line B2, and an outer edge 535 of the frame region 530.

Next, FIG. 22 will be referred to. FIG. 22 is a cross-sectional view of the liquid crystal display device 500a, which shows an X1-Y1 plane. The Y1 axis passes through the point C shown in FIG. 21 and is perpendicular to the display plane 19 of the liquid crystal display panel 500.

FIG. 22 shows light rays going out from the pixels arrayed in the display region 520 with broken lines. As shown in FIG. 22, light going out from the pixels in the first peripheral display section 521 enters the lens portion 610, and is refracted in the X1 direction. At this point, the light incident on the lens portion 610 is refracted by the viewer-side surface (referred to also as an "outgoing face") of the lens portion 610, and goes out from the viewer-side surface of the lens portion 610 located on the first peripheral display section 521 and the first frame portion 531. The light going out from the viewer-side surface of the lens portion 610 travels straight in a direction perpendicular to the display plane 19. Therefore, when observed from the direction perpendicular to the display plane 19 of the liquid crystal display device 500a, an image formed in the first peripheral display section 521 of the liquid crystal display panel 500 is displayed in enlargement in the region including the first peripheral display section 521 and the first frame portion 531. Hence, the first frame portion 531 is invisible.

Since the liquid crystal display device 500a has the lens portion 610, which corresponds to the entire frame region 530 of the liquid crystal display panel 500, the frame region 530 can be made entirely invisible to the viewer. However, the present invention is not limited to this, and only a part of the frame region 530 (e.g., the first frame portion 531) may be made invisible. Portions other than the corner portion such as the first frame portion 531 may be visually obscured by any conventional method; however, it is preferable to use a lens portion integrated into the light-transmitting cover 600.

As described above, each liquid crystal display device 500a can visually obscure the first frame portion 531. Since the non-display region 538 of the liquid crystal display device 500B shown in FIG. 19 is included in an assembly of the first frame portions 531 of the four liquid crystal display devices 500a, the liquid crystal display device 500B can visually obscure the non-display region 538.

As described above, the liquid crystal display device 500a shown in FIG. 20(a) includes the lens portion 610 corresponding to the entire frame region 530 of the liquid crystal display panel 500. Therefore, a jointless image can be displayed, and other portions of the frame than the portion which would otherwise appear as the joint can be visually obscured. Hence, the liquid crystal display device 500B can display an image in a still larger screen.

FIG. 22 also shows light rays going out from pixels in the central display region 524. The outgoing face of the flat portion 650 located on the central display region 524 is parallel to the display plane 19. Light going out from the central display region 524 enters the flat portion 650, travels straight through the flat portion 650 in a direction perpendicular to the display plane 19, and goes out toward the viewer's side.

Now, among portions of the lens 610, a portion located on the first peripheral display portion 521 and the first frame portion 531 (such a portion will be referred to as the "first lens body 611") is preferably a part of a cubic body which is obtained by cutting a body of revolution along two planes including the axis of revolution. It is preferable that this part of the body of revolution is located such that the axis of revolution matches the Y1 axis. In other words, it is preferable that this part is located such that the axis of revolution passes the point C and is perpendicular to the third border line B3 and the fourth border line B4. In this specification, a "body of revolution" means a cubic body which is obtained by rotating a plane figure by 360° around a straight line which exists in a plane same as the plane figure. This straight line will be referred to as the "axis of revolution".

Any of the liquid crystal display devices in the embodiments according to the present invention described above may include a housing including a housing portion located on side surfaces of the display panel, like a liquid crystal display device 700A described below. It is preferable that especially a display device including one display panel includes a housing described below. With reference to FIG. 23, the liquid crystal display device 700A will be described. FIG. 23 is a schematic cross-sectional view of the liquid crystal display device 700A. As shown in FIG. 23, the liquid crystal display device 700A includes one liquid crystal display panel 10, a light-transmitting cover 20 located on the viewer's side of the liquid crystal display panel 10, and a housing 30.

The liquid crystal display panel 10 includes a display region 10A and frame regions 10F provided outside the display region 10A. The liquid crystal display panel 10 may be any known transmission type liquid crystal display panel 10. Below the liquid crystal display panel 10, a backlight device 40 is provided. The backlight device 40 is not necessary when a self-light-emitting type display panel such as an organic EL display panel or the like is used.

The light-transmitting cover 20 includes lens portions 22 and a flat portion 24. The lens portions 22 of the light-transmitting cover 20 are each located at a position overlapping a region including the frame region 10F of the liquid crystal display panel 10 and a peripheral display region 10D, which is a part of the display region 10A adjoining the frame region 10F. Light going out from each peripheral display region 10D is refracted by the lens portion 22, so that an image formed in the peripheral display region 10D is enlarged to a region including the peripheral display region 10D and the frame region 10F. The liquid crystal display panel 10 includes the frame regions 10F, but the frame regions 10F can be visually obscured by providing the light-transmitting cover 20 including the lens portions 22 on the viewer's side of the liquid crystal display panel 10.

The housing 30 can protect the liquid crystal display panel 10. The display device 700A in this embodiment includes the housing 30 and thus can prevent the display panel from being exposed to dust or water. The display device 700A can also protect the display panel against a direct impact. Hereinafter, portions of the housing will be each referred to as the "housing portion". The housing 30 includes lateral housing portions 36 and a bottom housing portion 38. The lateral housing portions 36 are light-transmitting and are provided on side surfaces 10b of the liquid crystal display panel 10. The bottom housing portion 38 is provided below the backlight device 40.

Since the lateral housing portions 36 are light-transmitting, light incident on the lateral housing portions 36 from the rear side thereof partially goes out toward the viewer's side of the lateral housing portions 36. Therefore, rear environment behind the lateral housing portions 36 is visible to the viewer through the lateral housing portions 36. Thus, a display device in which the frame is visually obscured can be realized.

Hereinafter, why the frame of the liquid crystal display device 700A is visually obscured will be described in more detail with reference to FIG. 24 and FIG. 25.

FIG. 24 is an enlarged cross-sectional view schematically showing an end portion and the vicinity thereof of the liquid crystal display device 700A.

The liquid crystal display panel 10 has a rectangular or square shape. The display region 10A includes a plurality of pixels arrayed in a matrix of rows and columns. The display region 10A includes the peripheral display region 10D adjoining the frame region 10F and a central display region 10B, which is a part of the display region 10A other than the peripheral display region 10D. The row direction will be referred to as the "first direction D1" (direction perpendicular to the sheet of FIG. 24; shown in FIG. 25 referred to later), and the column direction will be referred to as the "second direction D2".

The liquid crystal display panel 10 includes, for example, an upper substrate 11, a lower substrate 12, and a liquid crystal layer 13 provided between the upper substrate 11 and the lower substrate 12. The lower substrate 12 includes, for example, TFTs and pixel electrodes. The upper substrate 11 includes, for example, a color filter layer and a counter electrode. Polarizer plates are located when necessary above the upper substrate 11 and below the lower substrate 12. In the frame region 10F of the liquid crystal display panel 10, a sealing portion 16, driving circuits and the like are formed. The backlight device 40 is, for example, an edge-light type backlight device which includes an LED, a light guide plate, and an optical sheet, such as a diffuser, a prism sheet or the like.

The lens portion 22 of the light-transmitting cover 20 is located at a position overlapping a region including the frame region 10F and the peripheral display region 10D of the liquid crystal display panel 10. A viewer-side surface 22a of the lens portion 22 is curved. The flat portion 24 is located at a position overlapping the central display region 10B. An outgoing face of the flat portion 24 is parallel to a display plane 10a of the liquid crystal display panel 10. The light-transmitting cover 20 has a rectangular or square shape. The lens portion 22 is provided along each of two out of four sides of the light-transmitting cover 20 extending in the first direction D1.

The lateral housing portions 36 of the housing 30 are light-transmitting and are provided outside the side surfaces along two out of the four sides of the liquid crystal display panel 10 extending in the first direction D1. A viewer-side surface 36a and a rear surface 36c of each lateral housing portion 36 are parallel to the display plane 10a of the liquid crystal display panel 10.

FIG. 24 shows, with broken lines, light rays going out from the pixels arrayed in the display region 10A and entering the light-transmitting cover 20 and light rays entering the lateral housing portion 36 from the rear side thereof. As shown in FIG. 24, light going out from the peripheral display region 10D enters the lens portion 22 and is refracted outward (toward the frame region 10F side). At this point, the light incident on the lens portion 22 is refracted by the viewer-side surface 22a of the lens portion 22 and goes out from the viewer-side surface 22a of the lens portion 22 located on the peripheral display region 10D and the frame region 10F. The light going out from the viewer-side surface 22a of the lens portion 22 travels straight in a direction perpendicular to the display plane 10a. Therefore, an image formed in the peripheral display region 10D of the liquid crystal display panel 10 is enlarged to a region including the peripheral display region 10D and the frame region 10F. Hence, the frame region 10F is visually obscured. Meanwhile, light going out from the pixels arrayed in the central display region 10B enters the flat portion 24 and travels straight in a direction perpendicular to the display plane 10a. Therefore, on the viewer's side of the flat portion 24, an image formed in the central display region 10B is displayed. Light incident on the lateral housing portion 36 from the rear surface 36c thereof travels straight through the lateral housing portion 36 in a direction perpendicular to the rear surface 36c and goes out from the viewer-side surface 36a. Therefore, the rear environment behind the lateral housing portion 36 is visible to the viewer through the lateral housing portion 36. Thus, a display device in which the frame is visually obscured is realized.

The lens portions 22 are provided on the frame regions along the two sides extending in the first direction D1, and thus a part of the image is displayed on the frame regions 10F along the two sides extending in the first direction D1. The lateral housing portions 36 are provided outside the two sides of the liquid crystal display panel 10 extending in the first direction D1, and thus the rear environment behind the lateral housing portions 36 is visible outside the two sides of the liquid crystal display panel 10 extending in the first direction D1, to the viewer through the lateral housing portions 36. Hence, the liquid crystal display device 700A can visually obscure the frame regions along the two sides extending in the first direction D1.

FIG. 25 schematically shows the liquid crystal display device 700A as seen from the viewer's side. FIG. 25 shows a region 101 in which an image is to be displayed, regions 102 in which the frame is visually recognized, and regions 103 in which the rear environment is visible therethrough. As shown in FIG. 25, the frame regions along the two sides extending in the second direction D2 are visually recognized (regions 102 in which the frame is visually recognized). By contrast, along the two sides extending in the first direction D1, the rear environment behind the lateral housing portions 36 is visible therethrough (regions 103 in which the rear environment is visible therethrough). Namely, the liquid crystal display device 700A can visually obscure the frame regions along the two sides extending in the first direction D1.

In the above-described embodiment, the rear environment behind the lateral housing portions is visible therethrough on the viewer's side, but the frame can also be visually obscured by displaying a part of an image, formed in the display region, on the viewer's side of the lateral housing portions. When light going out from the display region is partially allowed to go out toward the viewer's side of the lateral housing portions, a part of the image can be displayed on the viewer's side of the lateral housing portions. For example, unlike the above-described embodiment in which light going out from the peripheral display region is refracted outward by the lens portion and a part of the image is displayed on the frame region of the display panel, the light going out from the peripheral display region may be refracted further outward. Owing to this, a part of the image formed in the peripheral display region can be displayed on the viewer's side of the lateral housing portions. Also in a structure having both of a region in which a part of the image is displayed and a region in which the rear environment is visible therethrough are existent on the viewer's side of the lateral housing portions, the frame can be visually obscured. A part of light going out from the display region and also light entering the lateral housing portions from the rear side thereof may be allowed to go out toward the viewer's side of the lateral housing portions. Owing to this, both of a region in which a part of the image is displayed and a region in which the rear environment is visible therethrough can be existent.

The bottom housing portion 38 of the housing 30 may be a separate member from the lateral housing portions 36 or may be omitted. In either of these cases, the effects of the present invention are not marred. The bottom housing portion 38 does not contribute to display and therefore does not need to be light-transmitting. The viewer-side surface 36a and the rear surface 36c of each lateral housing portion 36 are flat surfaces parallel to the display plane 10a, but the shape of the viewer-side surface and the rear surface of the lateral housing portions is not limited to this. For example, at least one of the viewer-side surface and the rear surface of the lateral housing portions 36 may be curved. The light-transmitting cover and the housing may not be separate from each other, and a lens-integrated housing including the light-transmitting cover and the housing integrated together may be used.

The liquid crystal display device 700A described above can visually obscure the frame regions along the two sides extending in the first direction, among the four sides, but may visually obscure any other frame.

A display device including one display panel and a housing allows the frame regions and a part of the housing provided outside the frame regions (horizontal housing portions) to be visually recognized. However, when light going out from the peripheral display region partially goes out toward the viewer's side of the horizontal housing portions, a part of the image is displayed on the viewer's side of the horizontal housing portions. When light incident on the horizontal housing portions from the rear side thereof goes out toward the viewer's side of the horizontal housing portions, the rear environment behind the horizontal housing portions is visible therethrough to the viewer. For these reasons, the frame can be visually obscured.

INDUSTRIAL APPLICABILITY

The present invention is preferably usable for a display device of a TV or a display device for displaying information.

| REFERENCE SIGNS LIST | |
|---|---|
| 10 | Liquid crystal display panel |
| 10A | Display region |
| 10B | Central display region |
| 10D | Peripheral display region |
| 10F | Frame region |
| 10b | Side surface of the display panel |
| 11 | Upper substrate |
| 12 | Lower substrate |
| 13 | Liquid crystal layer |
| 16 | Sealing portion |
| 18 | Pixel line |
| 18a | First pixel line |
| 18b | Second pixel line |
| 18c | Third pixel line |
| 20 | Light-transmitting cover |

-continued

REFERENCE SIGNS LIST

| | |
|---|---|
| 22 | Lens portion |
| 24 | Flat portion |
| 32 | Upper polarizer plate |
| 34 | Lower polarizer plate |
| 40 | Backlight device |
| 60 | Light diffusion structure |
| 100 | Liquid crystal display device |
| D1 | First direction |
| D2 | Second direction |

The invention claimed is:

1. A direct-viewing type display device, comprising:
a display panel including a display region which includes a plurality of pixel lines extending in a first direction and a frame region provided outside the display region, the display region and the frame region having a border extending in the first direction therebetween; and
a light-transmitting cover located on a viewer's side of the display panel;
wherein:
the plurality of pixel lines include a first pixel line adjoining the border, a second pixel line adjoining the first pixel line, and a third pixel line adjoining the second pixel line;
the first pixel line, the second pixel line and the third pixel line are of different colors from each other;
the light-transmitting cover includes a lens portion located so as to stride over the border, the lens portion refracting a portion of light, going out from the display region, toward the frame region;
a light diffusion structure is provided between the lens portion and a portion of the display panel including the first pixel line, the second pixel line and the third pixel line; and
the light diffusion structure includes a low light diffusion region on the side of the display region, the low light diffusion region being formed such that a light diffusion degree thereof increases continuously or step by step from a side of the display region toward the frame region.

2. The display device of claim 1, wherein the light diffusion structure is located at a position overlapping a region including a portion of the frame region of the display panel and a portion of a peripheral display region in the display region, the portion of the peripheral display region adjoining the portion of the frame region.

3. The display device of claim 1, wherein:
the plurality of pixel lines are arrayed so as to adjoin each other in a second direction perpendicular to the first direction; and
a light diffusion degree of the light diffusion structure in the second direction is higher than that in the first direction.

4. The display device of claim 1, wherein a light scattering film is provided as the light diffusion structure.

5. The display device of claim 1, wherein a lenticular lens is provided as the light diffusion structure.

6. The display device of claim 1, wherein the light diffusion structure contains a diffusion adhesive having a haze value between 30% and 70%.

7. A direct-viewing type display device, comprising:
a display panel including a display region which includes a plurality of pixel lines extending in a first direction and a frame region provided outside the display region, the display region and the frame region having a border extending in the first direction therebetween; and
a light-transmitting cover located on a viewer's side of the display panel;
wherein:
the plurality of pixel lines include a first pixel line adjoining the border, a second pixel line adjoining the first pixel line, and a third pixel line adjoining the second pixel line;
the first pixel line, the second pixel line and the third pixel line are of different colors from each other;
the light-transmitting cover includes a lens portion located so as to stride over the border, the lens portion refracting a portion of light, going out from the display region, toward the frame region;
a light diffusion structure is provided between the lens portion and a portion of the display panel including the first pixel line, the second pixel line and the third pixel line; and
the light diffusion structure comprises an adhesive layer and particles mixed in the adhesive layer; and
the light diffusion structure includes a low light diffusion region on a side of the display region, the low light diffusion region being formed such that a light diffusion degree thereof increases continuously or step by step from the side of the display region toward the frame region.

8. The display device of claim 7, wherein the light diffusion structure is located at a position overlapping a region including a portion of the frame region of the display panel and a portion of a peripheral display region in the display region, the portion of the peripheral display region adjoining the portion of the frame region.

9. The display device of claim 7, wherein:
the plurality of pixel lines are arrayed so as to adjoin each other in a second direction perpendicular to the first direction; and
a light diffusion degree of the light diffusion structure in the second direction is higher than that in the first direction.

10. The display device of claim 7, wherein the light diffusion structure contains a diffusion adhesive having a haze value between 30% and 70%.

11. The display device of claim 7, wherein the light diffusion structure is provided between the lens portion and the display panel so as to selectively overlap only peripheral portions of the display panel including the first pixel line, the second pixel line, and the third pixel line.

12. A direct-viewing type display device, comprising:
a display panel including a display region which includes a plurality of pixel lines extending in a first direction and a frame region provided outside the display region, the display region and the frame region having a border extending in the first direction therebetween; and
a light-transmitting cover located on a viewer's side of the display panel;
wherein:
the plurality of pixel lines include a first pixel line adjoining the border, a second pixel line adjoining the first pixel line, and a third pixel line adjoining the second pixel line;
the first pixel line, the second pixel line and the third pixel line are of different colors from each other;
the light-transmitting cover includes a lens portion located so as to stride over the border, the lens portion refracting a portion of light, going out from the display region, toward the frame region;

a light diffusion structure is provided between the lens portion and a portion of the display panel including the first pixel line, the second pixel line and the third pixel line; and the light diffusion structure includes a convexed and concaved surface provided on a rear side of the light-transmitting cover; and the light diffusion structure includes a low light diffusion region on a side of the display region, the low light diffusion region being formed such that a light diffusion degree thereof increases continuously or step by step from the side of the display region toward the frame region.

13. The display device of claim 12, wherein the light diffusion structure is located at a position overlapping a region including a portion of the frame region of the display panel and a portion of a peripheral display region in the display region, the portion of the peripheral display region adjoining the portion of the frame region.

14. The display device of claim 12, wherein:
the plurality of pixel lines are arrayed so as to adjoin each other in a second direction perpendicular to the first direction; and
a light diffusion degree of the light diffusion structure in the second direction is higher than that in the first direction.

15. The display device of claim 12, wherein the light diffusion structure contains a diffusion adhesive having a haze value between 30% and 70%.

16. The display device of claim 12, wherein the light diffusion structure is provided between the lens portion and the display panel so as to selectively overlap only peripheral portions of the display panel including the first pixel line, the second pixel line, and the third pixel line.

* * * * *